United States Patent
Ramadoss et al.

(10) Patent No.: US 10,162,405 B2
(45) Date of Patent: Dec. 25, 2018

(54) GRAPHICS PROCESSOR POWER MANAGEMENT CONTEXTS AND SEQUENTIAL CONTROL LOOPS

(71) Applicant: Intel Corporation, Santa Clara, CA (US)

(72) Inventors: Murali Ramadoss, Folsom, CA (US); Marc Beuchat, Yakum (IL)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/731,162

(22) Filed: Jun. 4, 2015

(65) Prior Publication Data

US 2016/0357241 A1    Dec. 8, 2016

(51) Int. Cl.
  *G06F 1/32*    (2006.01)
  *G06T 1/20*    (2006.01)
  *G06F 9/50*    (2006.01)

(52) U.S. Cl.
  CPC ............ *G06F 1/3293* (2013.01); *G06F 1/329* (2013.01); *G06F 1/3228* (2013.01); *G06F 9/5027* (2013.01); *G06T 1/20* (2013.01); *G06F 2209/509* (2013.01); *Y02D 10/122* (2018.01); *Y02D 10/24* (2018.01)

(58) Field of Classification Search
  None
  See application file for complete search history.

(56) References Cited

U.S. PATENT DOCUMENTS

| 6,442,697 B1 * | 8/2002 | Jain ...................... G06F 1/3203 713/300 |
| 7,149,910 B2 * | 12/2006 | Ishibashi ............... G06F 1/3203 713/300 |
| 2009/0096797 A1 | 4/2009 | Du et al. |

(Continued)

FOREIGN PATENT DOCUMENTS

| KR | 101183845 | 9/2012 |
| KR | 101454219 | 10/2014 |

OTHER PUBLICATIONS

Choi, Yoon Seo; "The power consumption control method toward the resource of GPU and apparatus thereof."; Aug. 28, 2014; Korean Intellectual Property Office.*

(Continued)

*Primary Examiner* — Wynuel S Aquino
(74) *Attorney, Agent, or Firm* — Green, Howard & Mughal LLP

(57) ABSTRACT

One or more system, apparatus, method, and computer readable media is described below for power management of one or more graphics processor resources. In some embodiments, a graphics processor context associated with an application an including power-related hardware configuration and control parameters is stored to memory. In some embodiments, graphics processor contexts are switched in and out as different application workloads are processed by resources of the graphics processor. In some embodiments, power-performance management algorithms are grouped and sequentially executed in ordered phases of a control loop to generate a compatible set of control parameter requests. Once finalized, the set is output as requests to graphics processor hardware and/or updates to stored graphics processor contexts.

11 Claims, 17 Drawing Sheets

(56) References Cited

U.S. PATENT DOCUMENTS

| | | | |
|---|---|---|---|
| 2010/0192156 A1* | 7/2010 | Hollingsworth | G06F 9/5011 |
| | | | 718/104 |
| 2012/0242671 A1* | 9/2012 | Wyatt | G09G 5/001 |
| | | | 345/520 |
| 2013/0300655 A1 | 11/2013 | Cameron et al. | |
| 2014/0146060 A1 | 5/2014 | Chung et al. | |
| 2014/0281615 A1 | 9/2014 | Panneer et al. | |
| 2015/0015589 A1 | 1/2015 | Chung et al. | |
| 2016/0062445 A1* | 3/2016 | Choi | G06F 1/3234 |
| | | | 713/320 |
| 2016/0224382 A1* | 8/2016 | Farhan | G06F 9/5011 |

OTHER PUBLICATIONS

HSA Platform System Architecture Specification; Revision: Version 1.0 Final • Issue Date: Jan. 23, 2015; 69 pages.

International Search Report and Written Opinion, dated Aug. 19, 2016, for PCT Patent Application No. PCT/US2016/030271, 15 pages.

International Preliminary Report on Patentability for International Patent Application No. PCT/US2016/03027, dated Dec. 14, 2017

* cited by examiner

GRAPHICS PROCESSOR POWER MANAGEMENT CONTEXTS AND SEQUENTIAL CONTROL LOOPS

BACKGROUND

Many computing platforms or systems employ a graphics processor as a subsystem that performs image processing/rendering and/or parallel computation. A graphics processor may consume large amounts of power. Mobile computing platforms operating under stringent power constraints (e.g., to maximize battery charge duration) typically attempt to manage graphics power and performance controls, for example by placing various components of the computing system in different performance states. Conventional power management algorithms may however perform poorly in use cases where multiple applications are sending workloads to a graphics processor concurrently, for example in platforms operating in partial-screen and/or multi-display modes.

Also, many graphics power management systems today entail a number of algorithms and systems that independently attempt to improve specific aspects of power efficiency, operating as a patchwork rather than a cohesive unit. With no clear ownership of power-performance controls, current solutions rely on inter-algorithm communication to prevent graphics processor resource access conflicts. As such, it is left to the developer of each algorithm to track dependencies with supplemental algorithms, a problem that increases in complexity with each new power management algorithm introduced. Competition between algorithms further complicates integrating new techniques into a power management architecture as competition between algorithms becomes more likely.

A graphics processing subsystem that is able to achieve greater power efficiency and/or unify the graphics power management architecture would therefore be advantageous in the marketplace.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
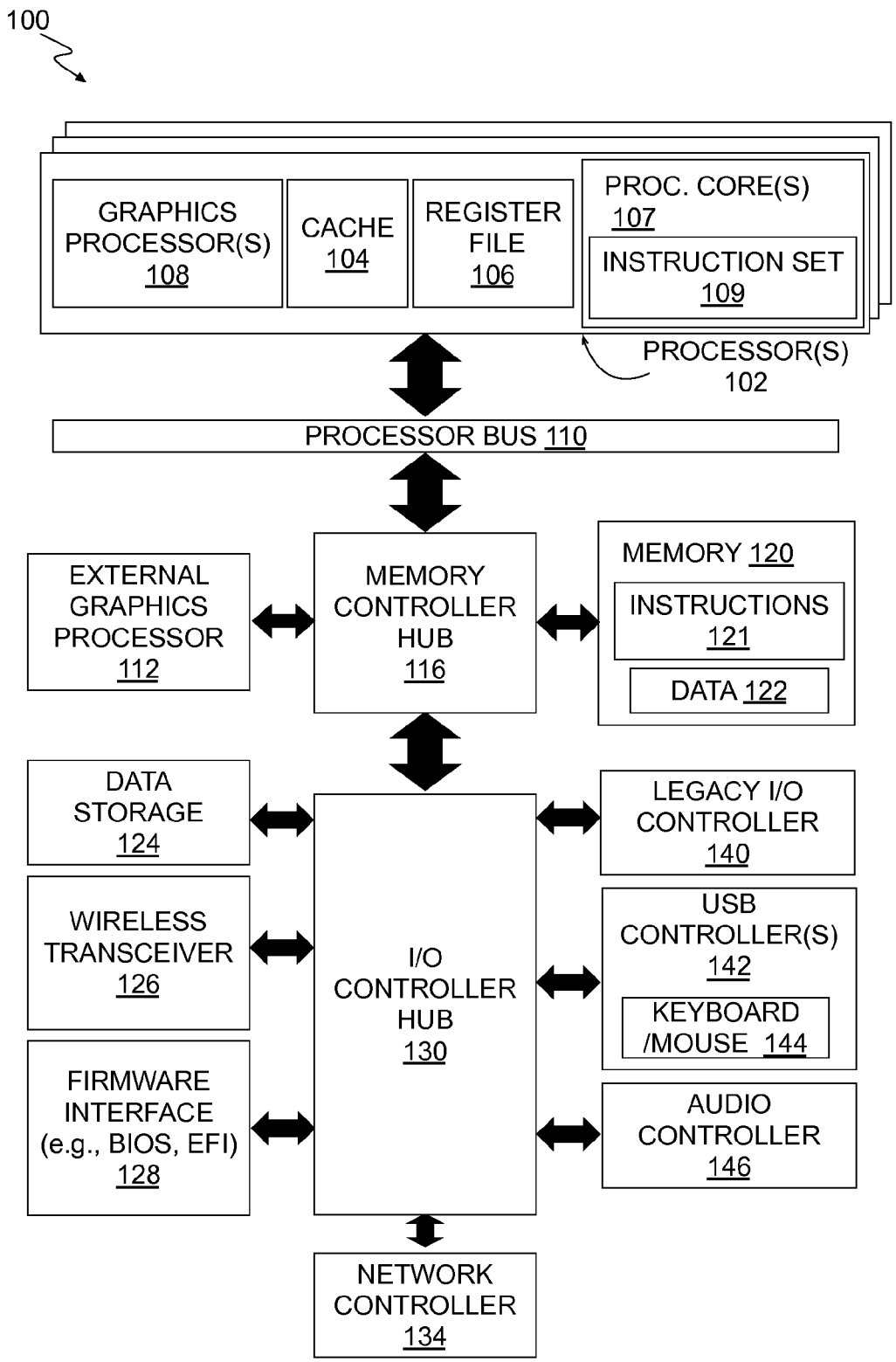
FIG. 1 is a block diagram of a data processing system, according to some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment," "in one embodiment," or "in some embodiments" in various places throughout this specification are not necessarily referring to the same embodiment(s). Furthermore, the particular features, structures, functions, or characteristics described in the context of an embodiment, or "some embodiments" may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Unless otherwise specified, the terms "substantially," "close," "approximately," "near," and "about" employed herein refer a margin of +/−20% of a nominal or target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

One or more system, apparatus, method, and computer readable media is described below for automated power-performance management of graphics processor (GP) resources. In some embodiments, graphics processor configuration information and power management state information is stored in memory in association with an application. Such graphics processor contexts are then utilized to ensure appropriate graphics processor resources are timely switched-in and/or switched/out as specific workloads are processed. In this manner, power management control is extended to the granularity of specific application render or compute work. In some embodiments, historical state information is maintained in association with particular contexts across execution of multiple workloads. Graphics processor contexts may be updated as needed based on one or more power-performance management algorithm evaluated during execution of workloads. In some embodiments, graphics power-performance management evaluation interval is partitioned into phases with algorithms executed in each phase to determine one or more power-performance parameter in a set of values that are collected and output during a final phase. In some further embodiments, phased graphics power-performance management is integrated with graphics processor contexts to implement fast (e.g., nanosecond) and slow (e.g., millisecond) power-performance control loops.

System Overview

FIG. 1 is a block diagram of a data processing system 100, according to an embodiment. Data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system-on-a-chip (SoC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processors cores 107 to process instructions which, when executed, perform operations for system and user software. In some embodiments, each of the one or more processors cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of system 100, while I/O Controller Hub (ICH) 130 provides connections to I/O devices via a local I/O bus.

Memory device 120 can be a dynamic random access memory (DRAM) device, a static random access memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with the one or more graphics processors 108 in processors 102 to perform graphics and media operations.

In some embodiments, ICH 130 enables peripherals to connect to memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
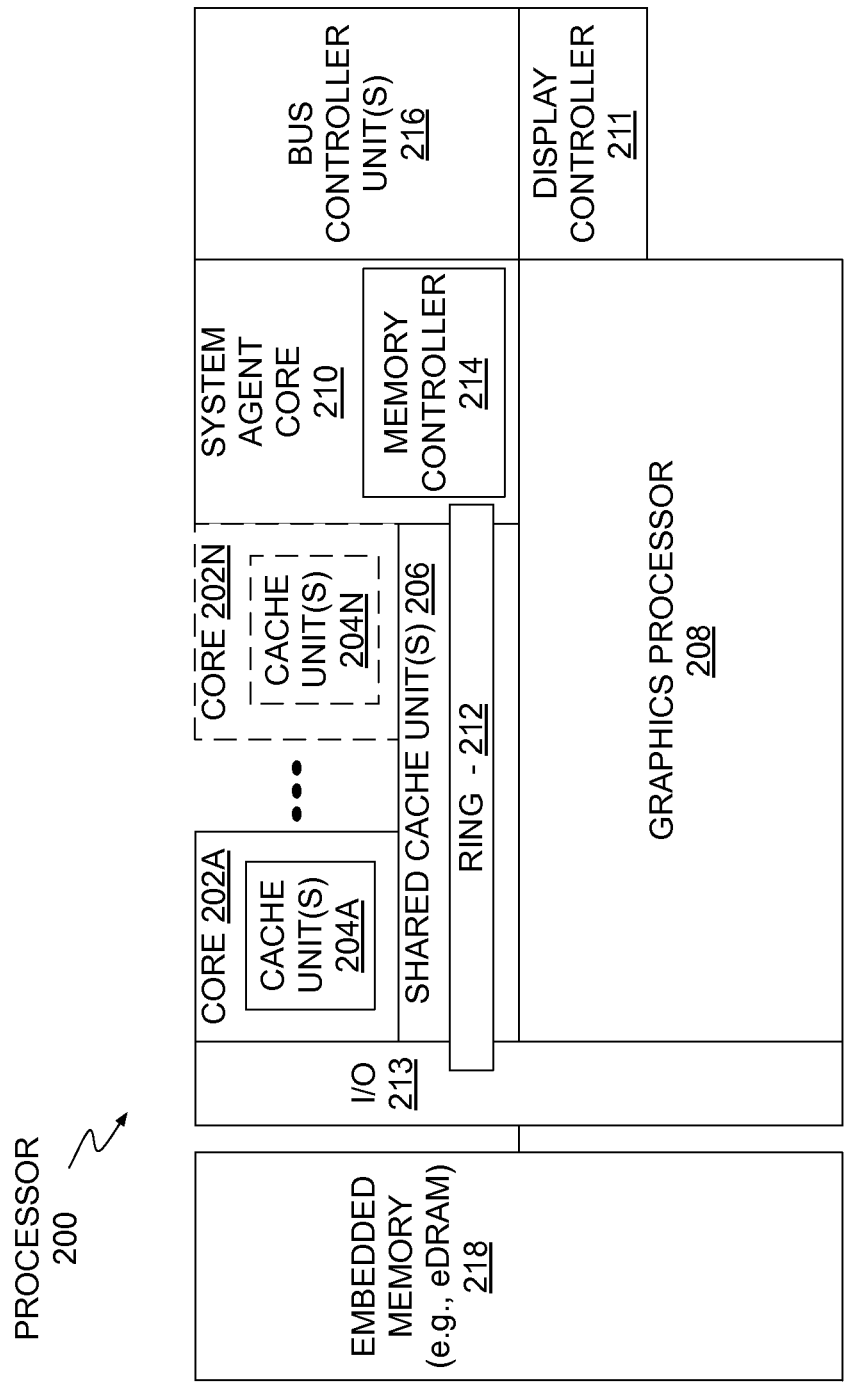
FIG. 2 is a block diagram of an embodiment of a processor having one or more processors cores, an integrated memory controller, and an integrated graphics processor, according to some embodiments.

FIG. 2 is a block diagram of an embodiment of a processor 200 having one or more processors cores 202A-N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of cores 202A-N includes one or more internal cache units 204A-N. In some embodiments each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-N.

In some embodiments, processor 200 may also include a set of one or more bus controller units 216 and a system agent 210. The one or more bus controller units manage a set of peripheral buses, such as one or more Peripheral Component Interconnect buses (e.g., PCI, PCI Express). System agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiment, the system agent 210 includes components for coordinating and operating cores 202A-N during multi-threaded processing. System agent 210 may additionally include a power control unit (PCU), which includes logic and components to regulate the power state of cores 202A-N and graphics processor 208.

In some embodiments, processor 200 additionally includes graphics processor 208 to execute graphics processing operations. In some embodiments, the graphics processor 208 couples with the set of shared cache units 206, and the system agent unit 210, including the one or more integrated memory controllers 214. In some embodiments, a display controller 211 is coupled with the graphics processor 208 to drive graphics processor output to one or more coupled displays. In some embodiments, display controller 211 may be separate module coupled with the graphics processor via at least one interconnect, or may be integrated within the graphics processor 208 or system agent 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the cores 202-N and graphics processor 208 use embedded memory modules 218 as a shared Last Level Cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a System-On-Chip (SOC) integrated circuit having the illustrated components, in addition to other components.

Figure 3:
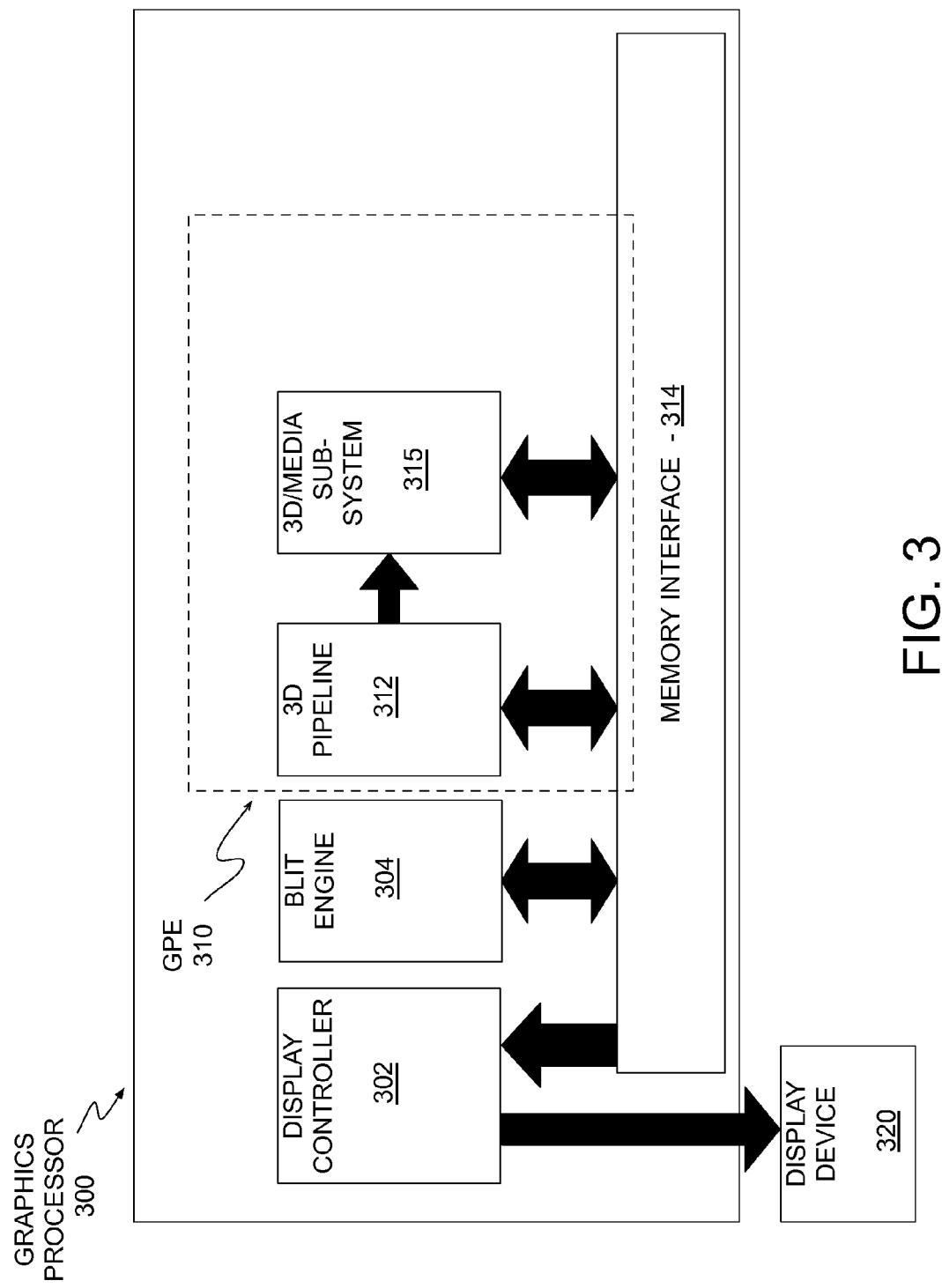
FIG. 3 is a block diagram of a graphics processor, according to some embodiments.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. In some embodiments, graphics-processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
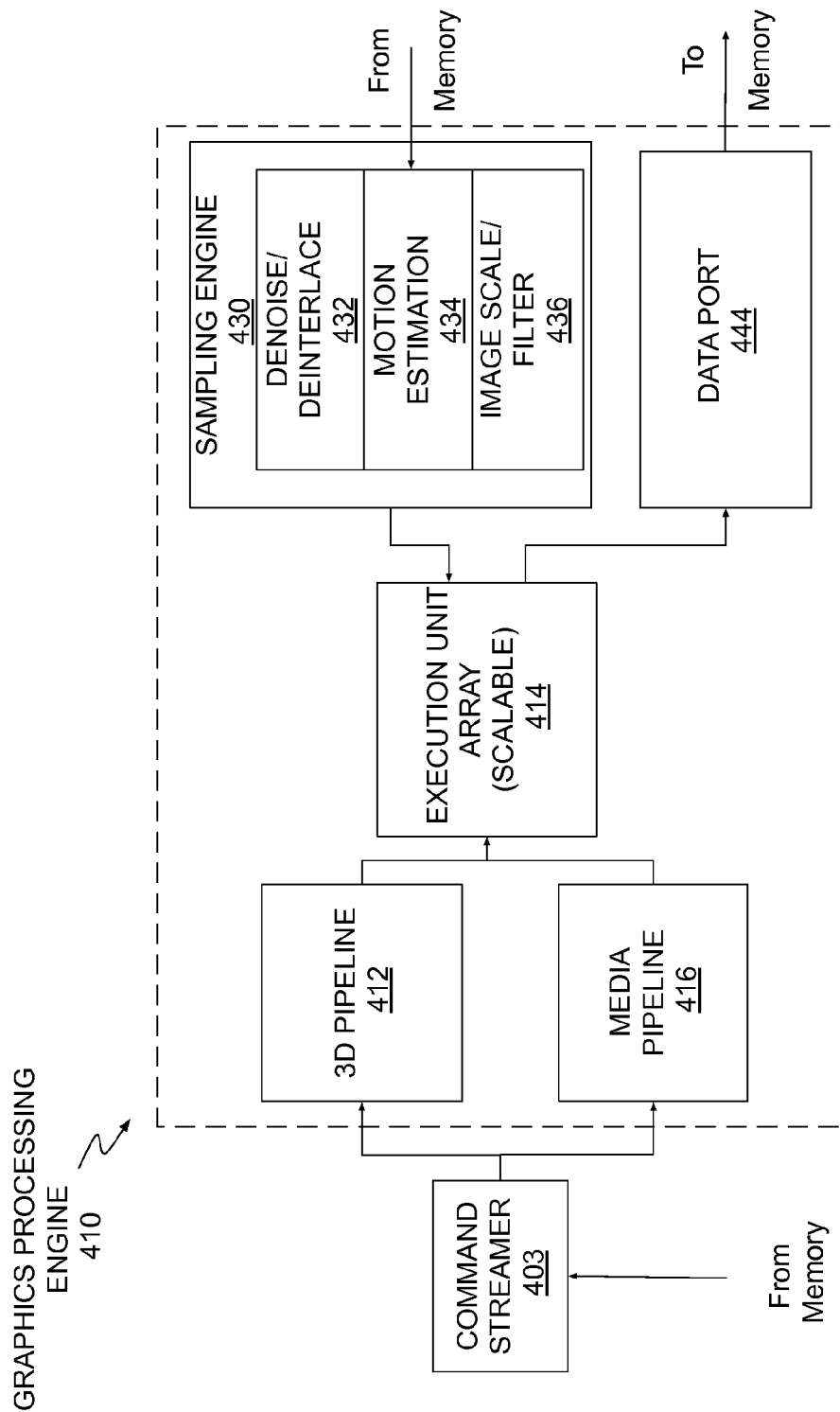
FIG. 4 is a block diagram of an embodiment of a graphics processing engine for a graphics processor, according to some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
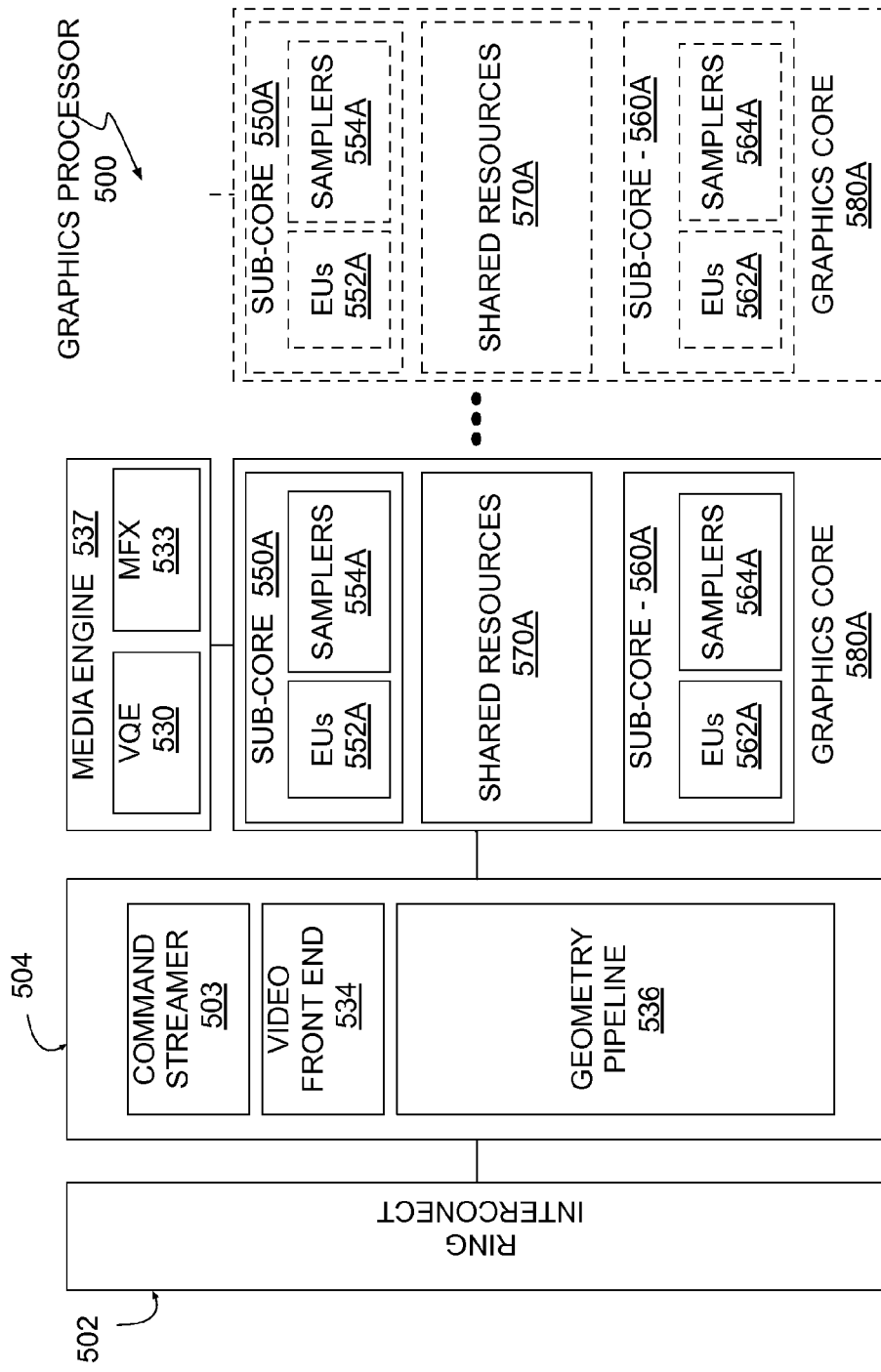
FIG. 5 is a block diagram of another embodiment of a graphics processor, according to some embodiments.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-N (sometimes referred to as core slices), each having multiple sub-cores 550A-N, 560A-N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
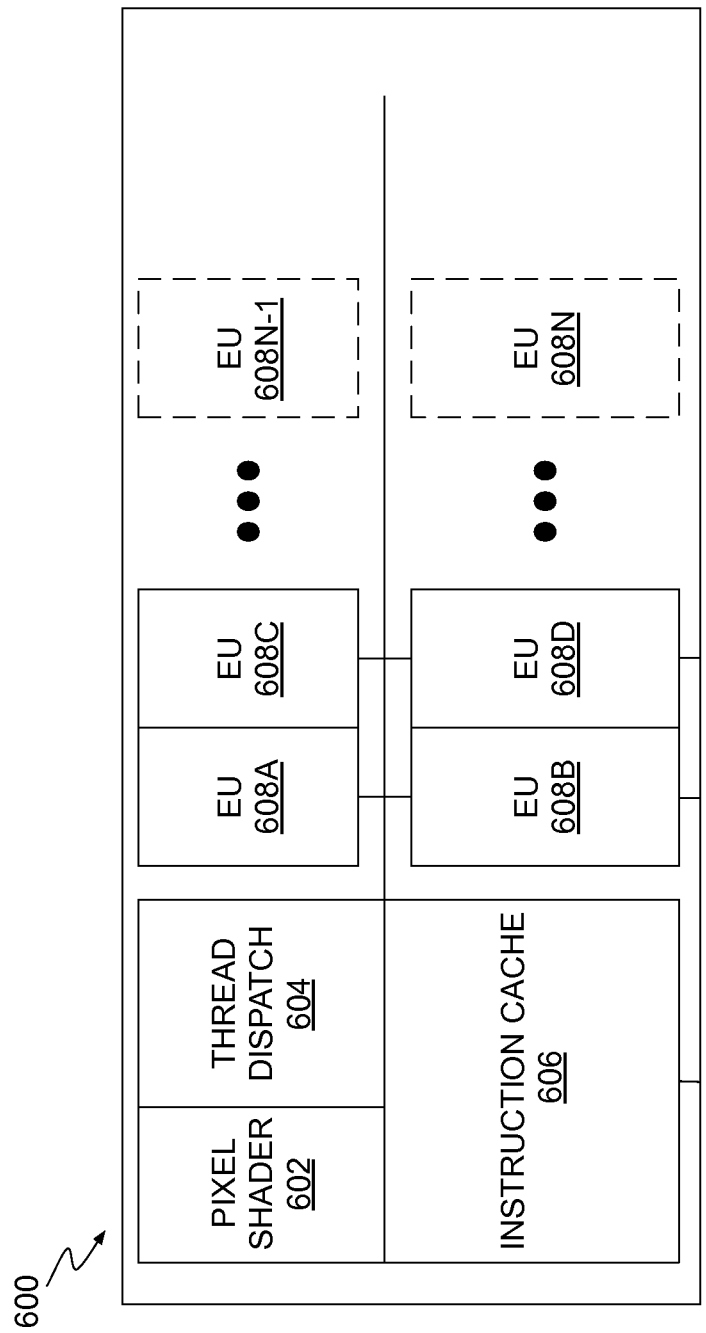
FIG. 6 illustrates thread execution logic including an array of processing elements employed in a graphics processing engine, according to some embodiments.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects have been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
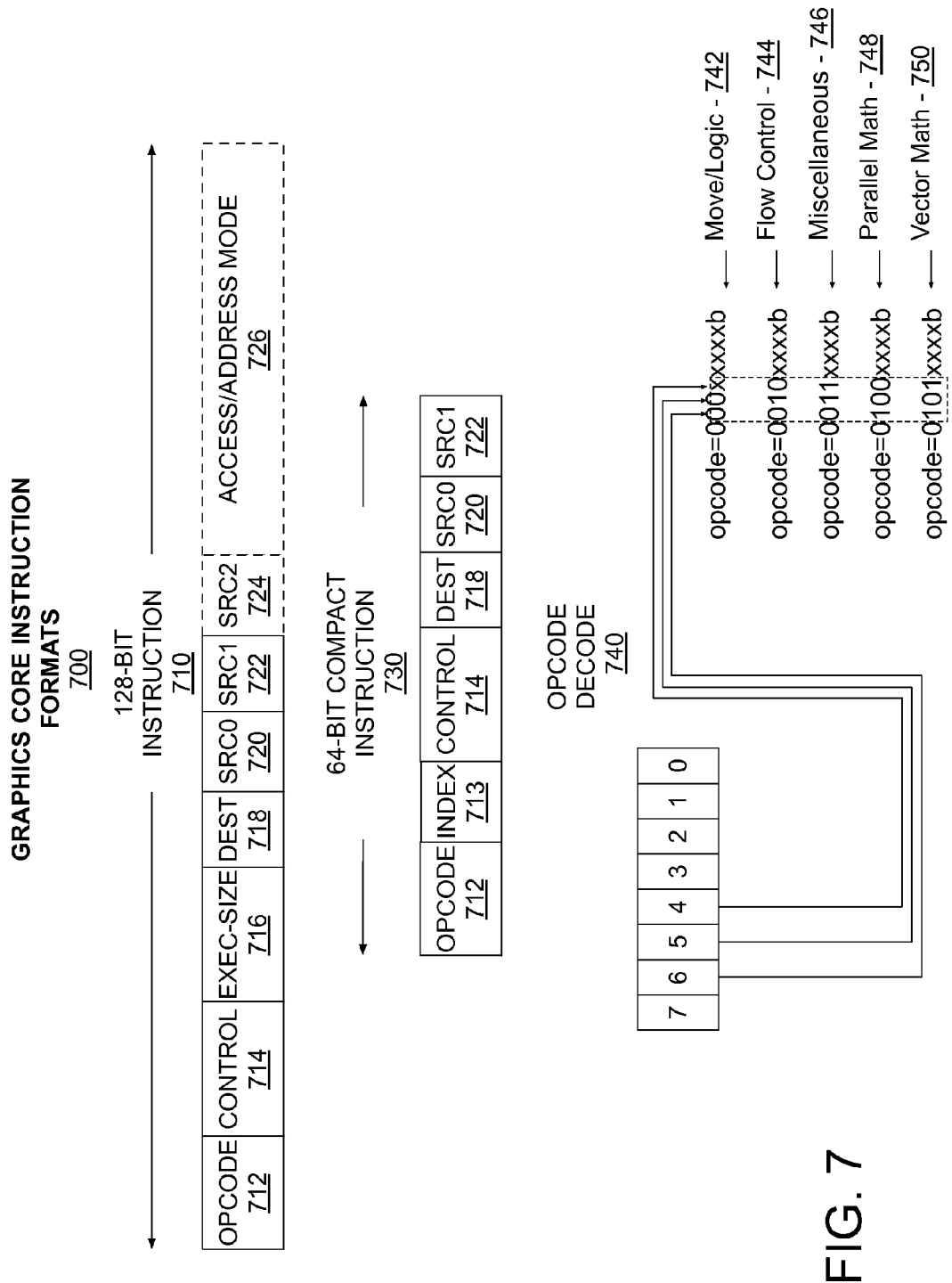
FIG. 7 is a block diagram illustrating a graphics processor execution unit instruction format, according to some embodiments.

FIG. 7 is a block diagram illustrating a graphics processor execution unit instruction format 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In some embodiments instructions are grouped based on opcode bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
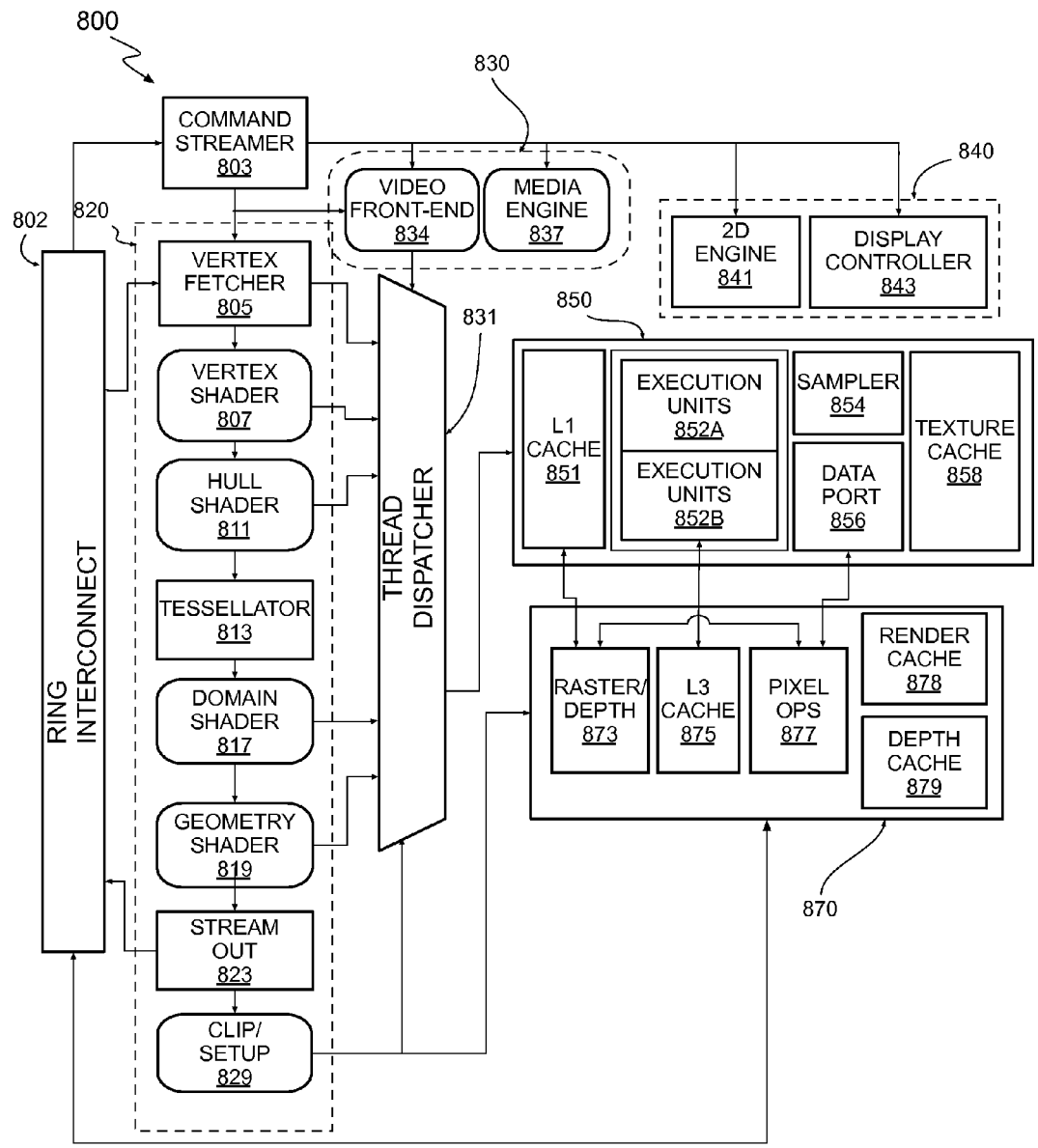
FIG. 8 is a block diagram of another embodiment of a graphics processor, which includes a graphics pipeline, a media pipeline, a display engine, thread execution logic, and a render output pipeline, according to some embodiments.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In some embodiments, a rasterizer 873 in the render output pipeline 870 dispatches pixel shaders to convert the geometric objects into their per pixel representations. In some embodiments, pixel shader logic is included in thread execution logic 850.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into their associated pixel-based representation. In some embodiments, the rasterizer logic includes a windower/masker unit to perform fixed function triangle and line rasterization. Associated render and depth buffer caches 878, 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 337 and a video front end 834. In some embodiments, video front end 834 receives pipeline commands from the command streamer 803. In some embodiment media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
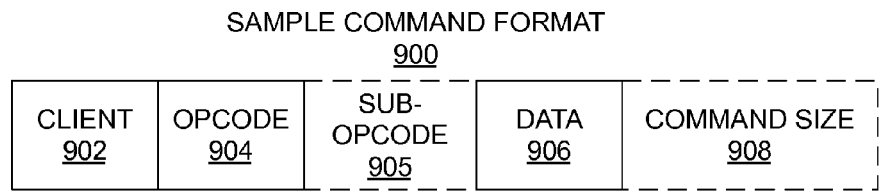
FIG. 9A is a block diagram illustrating a graphics processor command format, according to some embodiments.
Figure 9B:
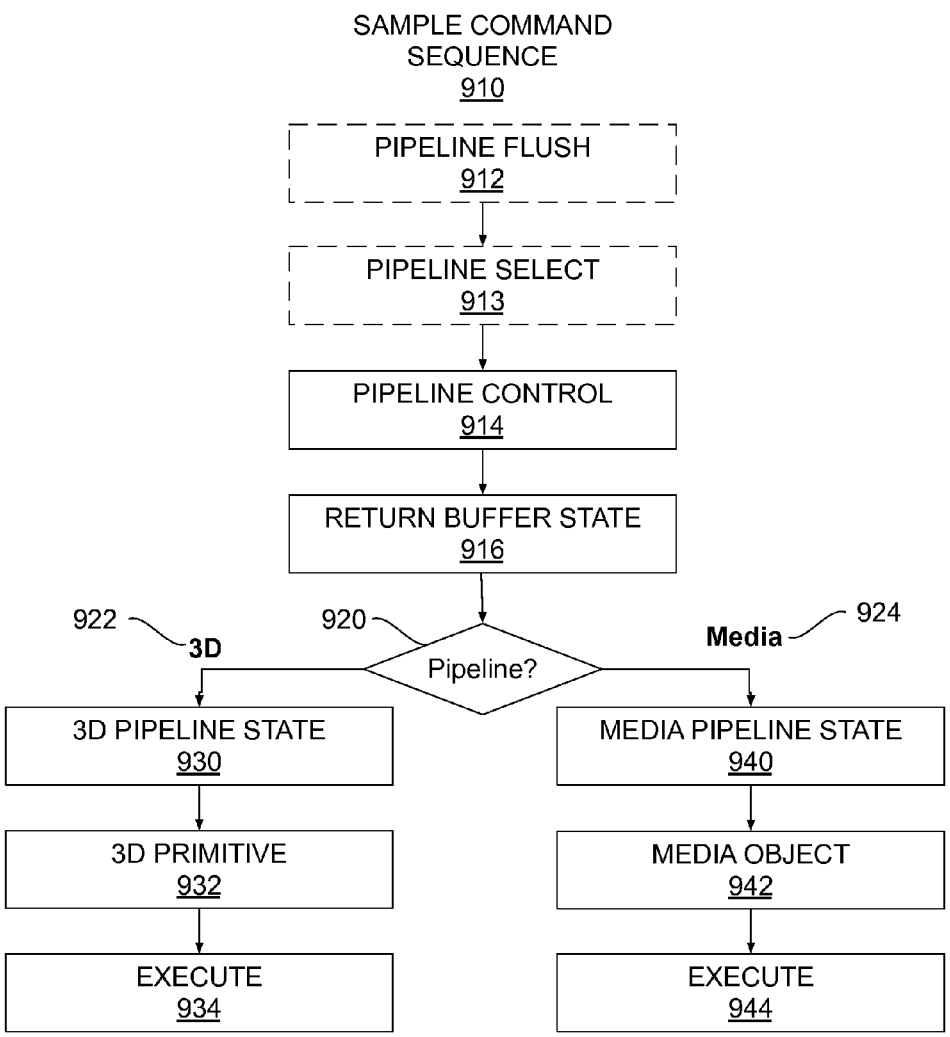
FIG. 9B is a block diagram illustrating a graphics processor command sequence, according to some embodiments.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, sample command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 934 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
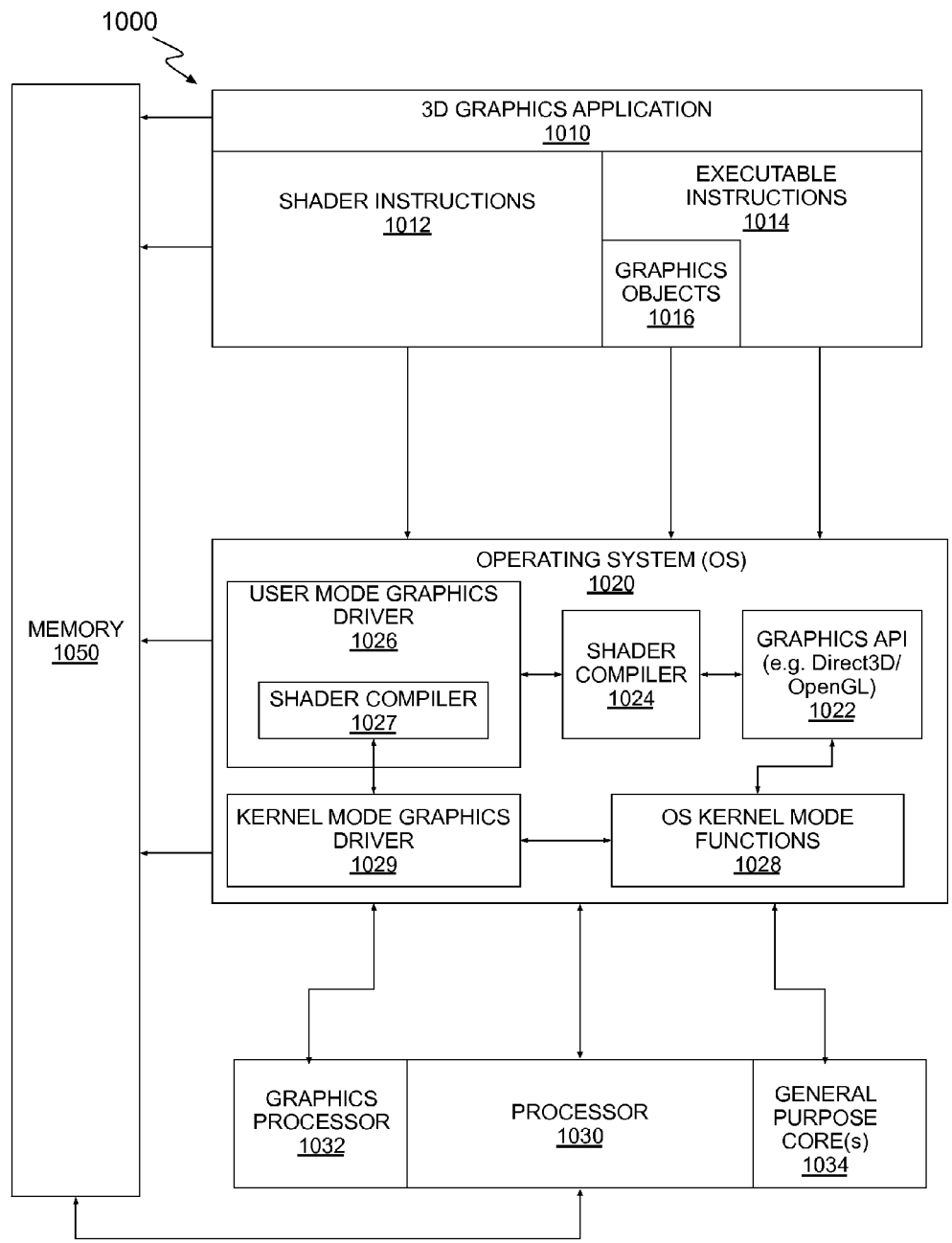
FIG. 10 illustrates exemplary graphics software architecture for a data processing system, according to some embodiments.

FIG. 10 illustrates exemplary graphics software architecture 1000 for a data processing system, according to some embodiments. Software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

Graphics Processor Power Management Contexts

Figure 11:
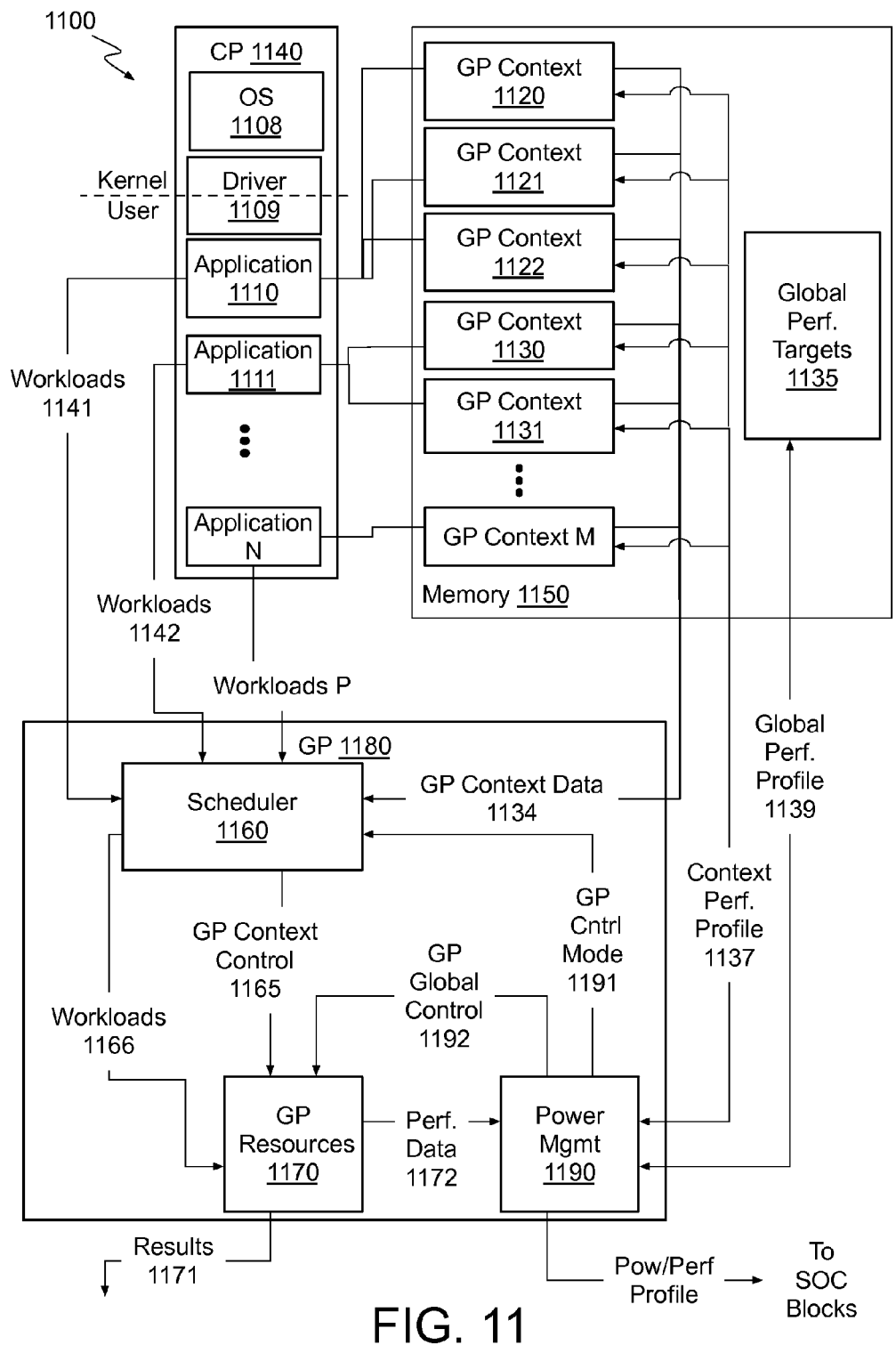
FIG. 11 is a block diagram illustrating a graphics processor power management architecture, in accordance with some embodiments.

FIG. 11 is a block diagram illustrating a graphics processor power management architecture 1100, in accordance with some embodiments. Architecture 1100 includes a central processor (CP) 1140, memory 1150, and graphics processor 1180. Central processor 1140, memory 1150, and graphics processor 1180 may each have any of the attributes described above in the context of FIG. 1-10. In one exemplary embodiment, central processor 1140, memory 1150, and graphics processor 1180 are all components on a single chip (system-on-chip, or SoC).

Central processor 1140 includes logic to execute and/or instantiate one or more applications 1110-1111, for example within a user space managed by an operating system 1108 executing within a kernel space of central processor 1140. Each of user applications 1110-1111 may generate distinct graphics workloads 1141, 1142 that are to be processed by graphics processor 1180. For example, a 3D game application may generate rendering workloads and/or compute workloads, a media player or camera controller application may generate media processing workloads and/or codec workloads, etc. The number of different types or classes of workloads sent to a graphics processor is dependent on the component capabilities of the graphics processor and the application developer. For example, graphics processors with a codec (encoder/decoder) block may be expected to receive codec-related workloads if an application developer elects to utilize that capability. Central processor 1140 might otherwise process such workloads, for example if graphics processor 1180 lacked a codec block. In addition to distinct workload types, applications can generate workloads at differing rates. Application 1110 may issue relatively few rendering workloads, for example in the case of a word processor application, or a great many, in the case of the 3D game for example.

In some embodiments, multiple user applications generate graphics workloads concurrently. For example, where OS 1108 provides a multi-tasking environment, applications 1110, 1111 may submit workloads 1141 and 1142 at substantially the same time. In a multi-display mode, for example, both workloads 1141 and 1142 may be entail rendering. Application workloads 1141, 1142 output to graphics processor 1180 (e.g., via driver 1109) are scheduled onto graphics processor resources 1170. Graphics processor resources 1170 include one or more resources, such as, but not limited to, execution units, media blocks, rendering pipelines, and encoder/decoder blocks. Each graphics processor resource may have any of the attributes described above in the context of FIG. 1-10. In the illustrated embodiment, scheduler logic 1160 is to arbitrate between received workloads and schedule their processing on graphics processor resources 1170. In some embodiments, scheduler logic 1160 is to perform time-slicing of graphics processor resources 1170 to process concurrently submitted workloads 1141, 1142 as consecutively scheduled workloads 1166 dispatched to various graphics processor resources 1170, which in-turn output workload results 1171. Scheduler logic may include software and/or hardware components. In some embodiments, scheduler logic 1160 is implemented by an OS executing on a central processor. For such embodiments, the OS may execute one or more coded workload scheduling algorithms and employ a kernel mode driver (KMD) to pass scheduled workloads to a graphics processor. For the embodiments illustrated in FIG. 11 however, scheduler logic 1160 is implemented by a microcontroller component of graphics processor 1180. The microcontroller (not depicted) may have any suitable internal micro-architecture, such as, but not limited to, an x86 architecture. The microcontroller is to receive workloads 1141, 1142, execute code comprising one or more scheduling algorithms, and output the scheduled workloads 1166 to one or more graphics processor resources 1170. In some embodiments, workload-scheduling code executed by the microcontroller is stored as firmware on graphics processor 1180.

In some embodiments, graphics processor resource configuration information and/or power management state information is stored to memory in association with a particular application. For example, graphics processor resource configuration and/or power management state information associated with workloads generated by application N may be stored in memory 1150 to a graphics processor context M. One or more graphics processor context may be stored for a given application. For example, graphics processor contexts 1120, 1121, and 1122 may be stored in association with application 1110, while contexts 1130, 1131 are stored to memory in association with application 1111.

In some embodiments, information stored in a graphics processor context is employed for switching the configuration of graphics processor resources as the resources process various different application workloads. As illustrated in FIG. 11, in addition to outputting scheduled workloads 1166, scheduler logic 1160 is to output to graphics processor resources 1170 one or more graphics processor contextual control parameters 1165 associated with the particular workload being scheduled. Scheduler logic 1160 is communicatively coupled to memory 1150 to access graphic processor context data 1134 stored in association with a particular graphic processor context. Graphics processor resource configuration may be switched based on parameters stored in a particular context that is associated with the workload and communicated concurrently with the workload. For example, in some embodiments a portion of commands streamed to a hardware resource specify configuration parameters accessed from the stored graphics processor context data structure.

Figure 12:
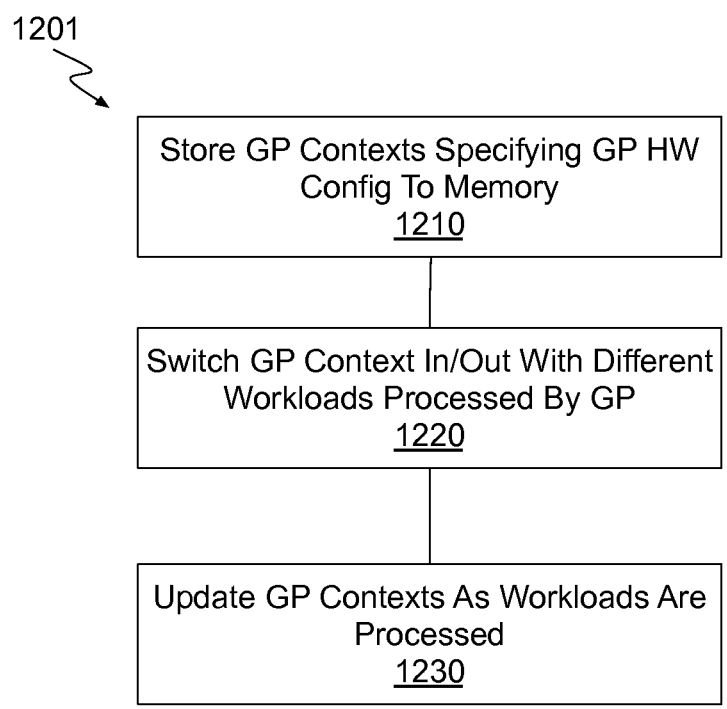
FIG. 12 is a flow chart illustrating a graphics processor power management method employing a graphics processor context, in accordance with some embodiments.

FIG. 12 is a flow chart illustrating a graphics processor power management method 1201 employing a graphics processor context, in accordance with some embodiments. Graphics processor 1180 (FIG. 11) may perform method 1201, for example. At operation 1210, graphics processor contexts, each a data structure including information indicative of a hardware configuration for one or more graphics processor resources, are created and stored to memory. At operation 1220, data stored in the graphics processor context is used to load the appropriate resource configuration when the workload scheduled to a graphics processor resource is executed by the resource. Context switching operation 1220 is to ensure that a predetermined power-performance configuration is set immediately as a scheduled workload begins running on the one or more graphics processor resources. At operation 1230, information associated with a graphics processor context is updated, for example based on performance data generated by the hardware resource that processed a workload while in that context. As described further below, context update operation 1230 is to maintain historical state information across execution of multiple concurrent workloads that enables power management algorithms to operate at the granularity of specific applications' graphics processor workload.

In some embodiments, a graphics processor context is associated with information indicative of at least a power state or an operating frequency of one or more graphics processor resource. In some embodiments, power state information specifies a power-gating configuration that powers-up or powers-down various sub-components of the graphics processor resources. In some embodiments, a graphics processor context is associated with information indicative of both a power state and an operating frequency of one or more graphics processor resource. In some embodiments, a graphics processor context is associated with information indicative of operating frequencies external to the graphics processor resources and/or graphics processor. For example, a graphics processor context may include information indicative of SoC component operating frequencies that are to be programmed when a particular context is switched-in and starts executing on the graphics processor resource(s). In some embodiments, a graphics processor context is associated with information indicative of power management state information that customizes power-management algorithms for a power-performance profile of the particular context.

Figure 13A:
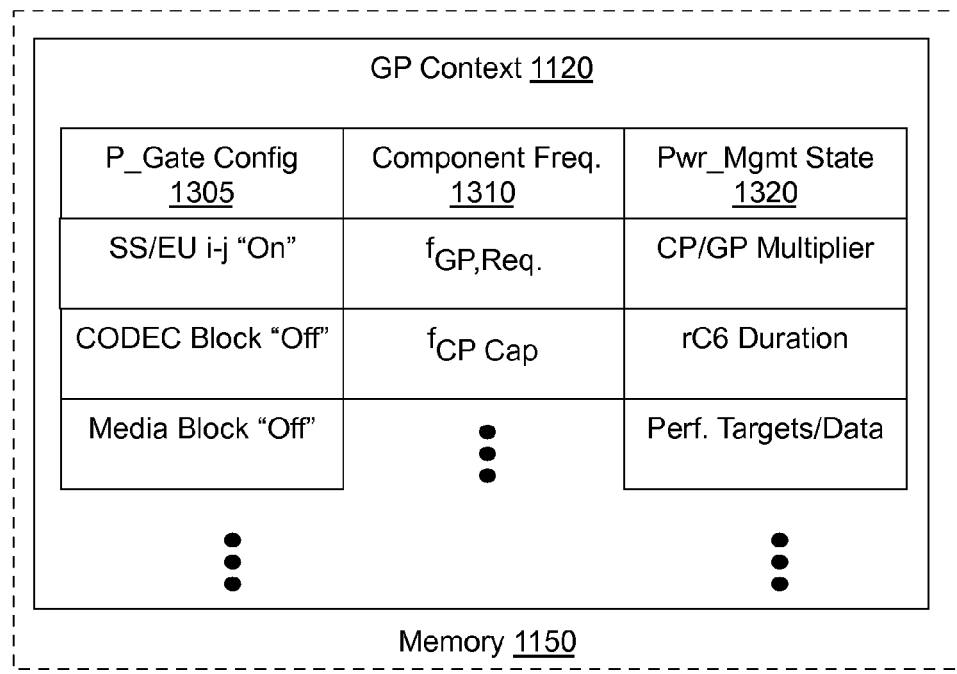
FIG. 13A illustrates a graphics processor context data structure, stored in a memory in accordance with some embodiments.

FIG. 13A further illustrates a graphics processor context 1120, stored in an electronic memory in accordance with some embodiments. In some embodiments, a graphics processor context comprises a data structure including a power gating (P_Gate) configuration control parameter. In some embodiments, a power gating configuration control includes parameters indicative of power states for one or more of a slice, sub-slice, execution unit, encoder/decoder block, or media block of a graphics processor. P_Gate control vector 1305, for example, specifies sub-slice and/or EU i-j to be powered up ("on"). P_Gate control vector 1305 further specifies a codec block of the graphics processor to be powered down ("off"). P_Gate control vector 1305 further specifies a media block of the graphics processor to be powered down ("off"). In some embodiments these power states are associated with on/off states for various corresponding power gate transistors controlling power distribution to predetermined graphics processor resources.

In some embodiments, a graphics processor context comprises a data structure further including a component operating frequency control parameter. Operating frequency control parameters stored to context 1120 may be specified for one or more graphics processor resource (e.g., graphics processor operating frequency target $f_{GP,Req}$). Operating frequency control parameters stored to context 1120 may be indicative of operating frequencies external to graphics processor resources and/or graphics processor. For example, component operating frequency control vector 1310 includes a parameter for a central processor maximum operating frequency $f_{CP,Cap}$ that may be utilized by a controller of a central processor resource to coordinate central processor power-performance control with control efforts being applied at the context-level within the graphics processor. Component operating frequency control vector 1310 may include other SoC operating parameters as well, such as a target central processor operating frequency $f_{CP,Req}$ affecting the balance of power between central processor(s) and graphics processor(s).

In some embodiments, a graphics processor context comprises a data structure further including power management state information. Power management state information specifies at least one of management algorithms, performance metrics, or performance targets. A performance management algorithm may specify how to manage a hardware resource's performance while the graphics processor context is in effect. For example, the performance management algorithm may manage performance to maximize a performance target of one or more powered-up hardware resource, and/or reach a target idleness (busyness) of one or more powered-up hardware resource. Power management state information stored in association with a graphics processor context may further include various performance characterizations made based on performance data output by one or more graphics processor resources while operating in the particular context. For example, power management state information may include statistical descriptors of graphics processor resource performance associated with a particular context.

In some embodiments, performance data and resulting characterization information is incrementally stored in the graphics processor context with each workload processed while the context was active. Examples of performance characterizing data include, but are not limited to, workload flip-rate, display refresh rate, and resource idleness (busyness). Power management state information stored in association with a context may further include context performance targets, such as, but not limited to, a maximum frame-rate (e.g., $fps_{max}$). A frame-rate target may be specified by an application or otherwise (e.g., through graphics driver management setting). Power management algorithms can therefore utilize the power management state information to exert either context-level or global control efforts, for example to achieve compatible frame-rates between applications. In the illustrated example, power management state information 1320 includes a central processor-graphics processor multiplier specifying a target operating frequency ratio to maintain between central processor resource(s) and graphics processor resource(s). Power management state information 1320 further includes a duty cycle control (DCC) performance target controlling a deep sleep state (rC6) duration. The DCC performance target may specify idleness for one or more graphics processor resources to achieve an overall improvement in graphics processor power efficiency and greater performance for active resources while under power-limited situations.

Figure 13B:
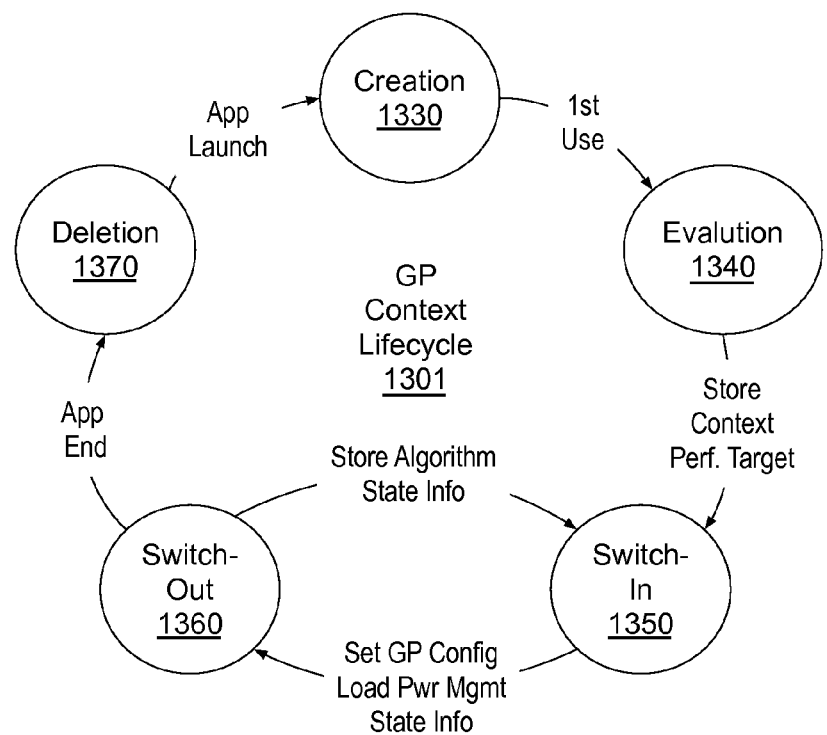
FIG. 13B illustrates a graphics processor context as a graphics processor power management method is performed, in accordance with some embodiments.

FIG. 13B illustrates a graphics processor context lifecycle 1301 as a graphics processor power management method is performed, in accordance with some embodiments. At the various stages illustrated, a given graphics processor context is operated upon, beginning with creation operation 1330 performed in response to launching of a user application. Creation operation 1330 may, for example, occur during operation 1210 (FIG. 12) to associate a particular context with a particular application workload. Context creation may be triggered when an application opens a connection to the graphics processor through the graphics driver API. For example, a first rendering context may be created at operation 1330 in response to a first application opening a rendering connection to the graphics processor. Alternatively, a compute context may be created in response to an application opening a compute connection to the graphics processor. Likewise, a second rendering context may be created at operation 1330 in response to a second application opening a rendering connection to the graphics processor, and so on. A user application and/or graphics processor driver may set some or all graphics processor context information at creation operation 1330. For example, a graphics processor context for a media player application may have a predetermined optimal graphics processor configuration to run any media workloads. These values are then to be stored in the graphics processor context associated with that application. In another example, an application may specify workloads of a context are to run at a maximum graphics processor operating frequency, or maximum frame-rate, etc.

Subsequent to context creation, the graphics processor context is employed a first time to process a first workload. Based on data collected during this first use, a performance profile for the context is characterized at context evaluation operation 1340. The performance profile may then be utilized to determine one or more performance metrics that are to be targeted by a power management algorithm for the particular context. The resulting characterization is to be stored back into the associated graphics processor context data structure, updating the context information at the end of some predetermined evaluation period (e.g., 100's-1000's of milliseconds).

In some embodiments, the context performance profile characterization is performed by power management logic responsible for implementing power management algorithms. For example, in further reference to FIG. 11, power management logic 1190 is communicatively coupled to memory 1150 and is to access and/or store contextual performance profile data 1137. In some embodiments, the same microcontroller executing workload scheduling code to implement scheduler logic 1160 also executes power management code to implement power management logic 1190. Alternatively, a graphics driver, for example executing in kernel mode on central processor 1140, may implement power management logic 1190.

Returning to FIG. 13B, once a context has been created and initially evaluated, the context information is accessed during switch-in operation 1350. In some embodiments, switching-in is triggered upon a scheduler determining to execute a workload on the graphics processor resources. Changes to the configuration of one or more graphics processor resources at operation 1350 are based on data stored in the graphics processor context. Such data may have originated from any of the creation operation 1330, evaluation operation 1340, or one or more prior executions of workloads submitted under this same context. Any of the power-gating configuration information, component frequency information, or power management state information introduced in reference to FIG. 13A may be applied at operation context switch operation 1350.

At operation 1360, the graphics processor context is switched out. Operation 1360 may be triggered by a graphics processor resource completing a workload or by a workload scheduler pre-emptively switching to another context.

Stored information associated with the graphics processor context may be updated at operation 1360. For example, additional management algorithm state information associated with the graphics processor context may be written out to the context data structure at the context switch out operation 1360. Such historical information may then be utilized when the same context is subsequently switched back in at operation 1350. Graphics processor power-gating configuration parameters may also be updated at the switch-out operation 1360, for example based on statistics collected during the execution of one or more workloads within this context over some graphics processor time slice(s).

Updates to power-gating configuration parameters may enable workloads associated with a particular context to execute more efficiently when the context is subsequently switched back in at operation 1350. Performance statistics may be based on performance data output by the graphics processor resources along with the workload processing results. Workload results are returned to the originating application, and the associated performance data may be written out to memory in association with the graphics processor context (e.g., written to the context data structure). Notably, the overhead associated with switching in control parameters of a particular context may be very little. For example, power-gating and operating frequency changes may be implemented in a few nanoseconds, or less. Hence, operations 1350 and 1360 may be performed in lock-step with workload processing without incurring a significant latency penalty. The final context operation illustrated in FIG. 13B is deletion operation 1370, where all stored context information is lost. Operation 1370 may be performed in response to an application closing a connection to the graphics processor (e.g., when a user application is closed).

With the above power-management architecture, performance profiling to each application workload is partitioned, enabling an optimal configuration (e.g., power-gating setup, operating frequency) to be selected for each application. Graphics processor configuration changes may be made immediately when a given application starts executing work on the graphics processor. Hence, the above power-management architecture is able to be more responsive to individual workload needs, meeting those needs more efficiently than is possible for architectures limited to longer control intervals that reflect requirements of many disparate workloads.

Referring back to the exemplary architecture illustrated in FIG. 11, context-specific performance targets may be processed by power management logic 1190 based on resource performance data 1172 output by graphics processor resources 1170. Performance data 1172 may be output contemporaneously with workload results 1171 such that performance data 1172 is attributable to the particular hardware configuration, power-management algorithm(s), and power-management state(s) in effect when the workload was processed. Performance data 1172 may therefore be associated with a particular graphics processor context and power management logic 1190 may process performance data 1172 to output contextual performance profile data 1137 that may be stored in association with corresponding graphics processor contexts 1120-1137.

In some embodiments, a power-management architecture is further based global performance targets. Global performance targets may be tracked and utilized in one or more power-management algorithms to control graphics processor hardware in a manner that supplements or augments application-specific context-level management. As used herein, a global performance target is associated with a metric that is evaluated over an interval that exceeds the switch-in and switch-out times of graphics processor contexts currently executing. For example, central processor/graphics processor operating frequency multiplier targets and DCC control targets may be advantageously modified over relatively long (e.g., millisecond) evaluation intervals. Because of the longer evaluation interval, global performance targets are not mapped uniquely to a single context. In the exemplary architecture illustrated in FIG. 11, power management logic 1190 may process graphics performance data 1172 to generate global performance profile data 1139 for the purpose of global power-management. In the illustrated example, global performance profile data 1139 includes global performance targets 1135 stored to memory 1150.

When multiple graphics processor contexts are executing workloads and switching in and out, power management logic 1190 is advantageously configured to execute power-management algorithms based either on context performance targets or global performance targets. A context-specific frame-rate target is an example of a contextual performance target while a single frame-rate target for all workloads is an example of a global performance target. In a use case where different regions of a display area are rendered for different applications (e.g., application GUI windows), each application may be sending workloads processed under an associated rendering context. Those contexts, might specify, for example, unique workload frame-rate targets (e.g., a 30 FPS target for camera image data workloads, and 120 FPS target for 3D game rendering workloads). Under each context then, respective scenes would be rendered into an off-screen memory buffer, which is then drawn at the refresh rate of the screen (e.g., 60 Hz). Under such circumstances, a global performance target relating to a visual quality metric, such as the screen refresh rate, is then applied across all rendering applications.

Figure 14:
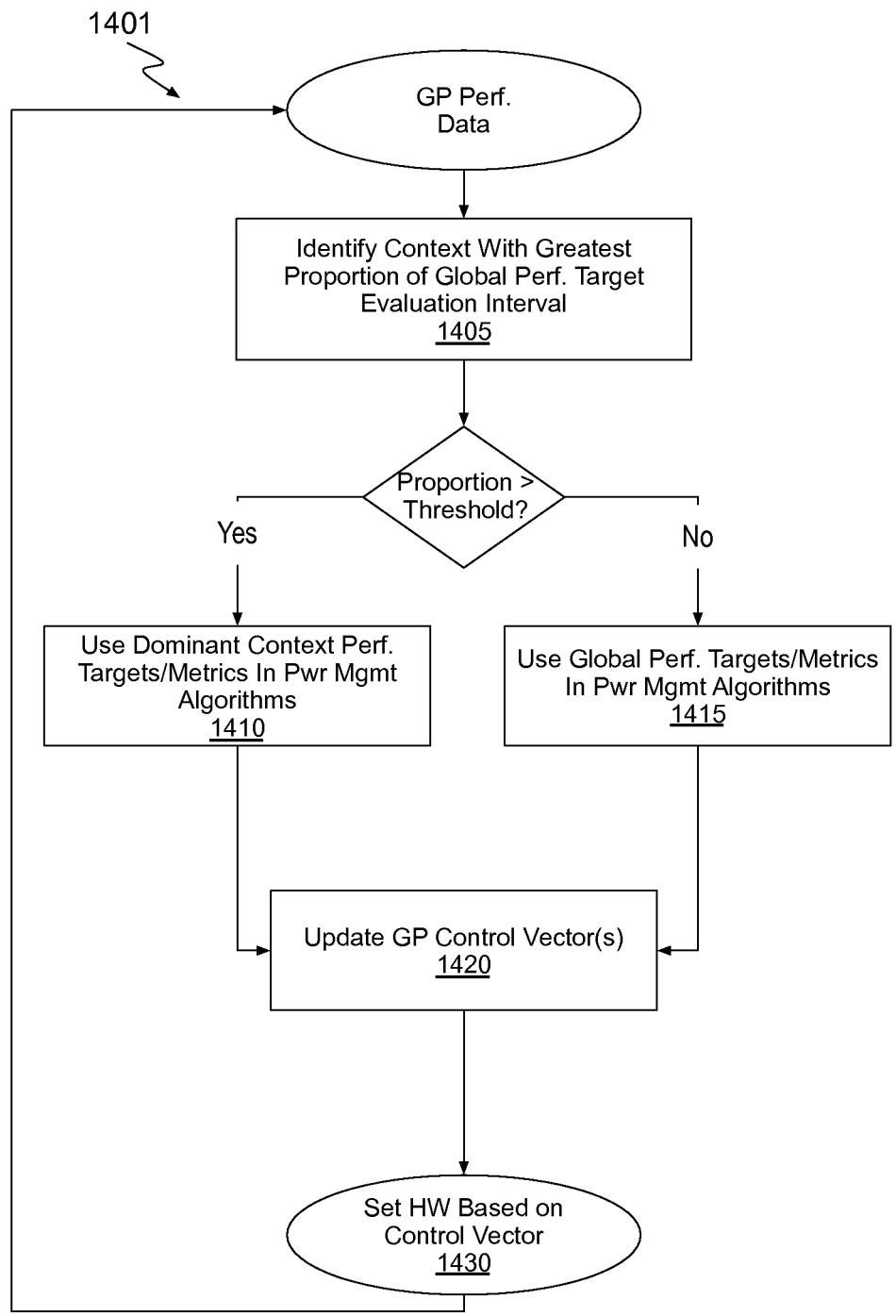
FIG. 14 is a flow diagram illustrating a power-performance method based on either global or context-specific graphics processor performance targets, in accordance with some embodiments.

FIG. 14 is a flow diagram illustrating a power-performance management method 1401 that is based either on global or context-specific graphics processor performance targets, in accordance with some embodiments. Method 1401 begins with collecting graphics performance data over a predetermined global performance target evaluation interval. At operation 1405, the dominant graphics processor context for the evaluation interval is identified. In some embodiments, the dominant graphics processor context is the context that consumes the greatest proportion of graphics processor resource time within the evaluation interval. In further embodiments, time slices associated with graphics processing under the dominant context are accumulated and compared to a predetermined threshold. If the dominant context processing time satisfies the threshold, method 1401 proceeds to operation 1410 where one or more power-performance management algorithms are implemented based on the context-specific performance targets associated with the dominant graphics processor context. The dominant context is therefore assumed to be responsible for the global performance targets.

If instead, the dominant context processing time fails to satisfy the threshold, the context is not deemed responsible for the global performance targets and method 1401 proceeds to operation 1415. To maintain the global performance target, power-performance management algorithms are implemented at operation 1415 using global performance metrics collected during the evaluation interval independent of graphics processor context. Global performance metrics may, for example, comprise graphics processor performance data averaged over all workloads processed during the evaluation interval, rather than only a subset of those associated with a dominant context. For each evaluation interval, one or more graphics processor resource control parameter is updated at operation 1420. The graphics processor hardware is then configured at operation 1430 based on those parameters. Method 1401 is then iterated once for each subsequent evaluation interval.

In some embodiments, context-level control over one or more graphics processor resource is selectable, providing multiple graphics processor resource control modes. In a first mode, graphics processor resource configurations are switched as a function of the workload, for example as described above. In a second mode, context-level control is disabled leaving graphics processor configuration control dependent on global performance targets. Referring again to the exemplary architecture illustrated in FIG. 11, power management logic 1190 is further configured to assess the workloads being processed and determine if scheduler logic 1160 is to implement context switching of graphics processor resources 1170. In the exemplary embodiment, power management logic 1190 is to generate a graphics processor control mode indicator 1191 that is communicated to scheduler logic 1160. Graphics processor control mode indicator 1191 may be a context control enable/disable flag bit, for example. Scheduler logic 1160 is then to be responsive to the control mode indicator 1191, either outputting contextual control 1165, or not. In absence of contextual control 1165, graphics processor resources 1170 may be configured and operated based on control parameters 1192 output by power management logic 1190, for example based on power management algorithms using global performance targets.

Figure 15:
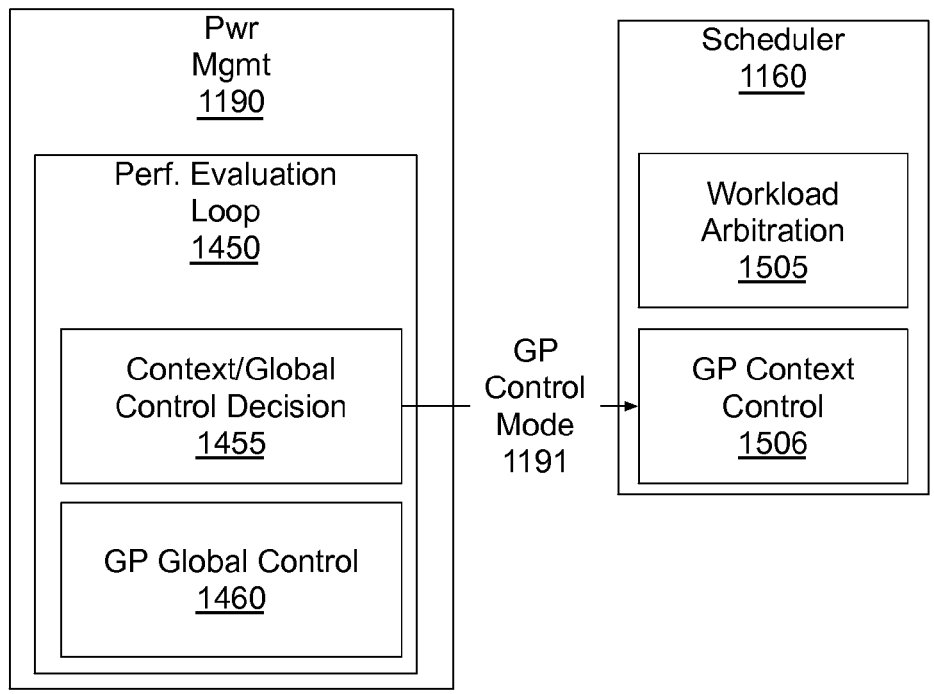
FIG. 15 is a block diagram illustrating global and context-level power management and workload scheduling on graphics processor resources, in accordance with some embodiments.

FIG. 15 is a block diagram further illustrating power management and workload scheduling on graphics processor resources, in accordance with some embodiments. In this architecture, power management logic 1190 is to execute a performance evaluation loop 1450 that includes selecting between global and context-level control of one or more graphics processor resource at operation 1455. In response to control mode flag 1191 output by power management logic 1190, scheduler logic 1160 implements context-based control 1506, or not, in conjunction with arbitration of workloads to graphics processor resources. Hence, scheduler logic 1160 may in a first mode perform only workload arbitration 1505, and in a second mode perform both workload arbitration 1505 along with context-based control 1506.

Without context-level control, power management logic 1190 exerts a global control effort on the one or more graphics processor resources at operation 1460 during the subsequent evaluation interval. In some embodiments, the control mode is based on a total number of different contexts switched in during the predetermined evaluation interval. If that number satisfies a predetermined threshold, for example, then global control may be selected for the subsequent performance evaluation interval. Although contexts may switch 500-1000 times/second, or more, switches may be between only a few different contexts (e.g., 1-3). Thus, a particular context may switch in and out many times during an evaluation interval that may be 50-100 milliseconds, for example. In such a situation, context-level control may provide significant advantageous over global control. However, when many (e.g., 10 or more) different contexts are switching-in, global control algorithms that average over the many contexts may be more advantageous. In alternative embodiments, context switching during the subsequent performance evaluation interval may be contingent on identifying a sufficiently dominant context. For example, context control may be enabled if there is a dominant context, and disabled if there is not sufficiently dominant context.

Phased Graphics Processor Power-Performance Management

In some embodiments, graphics processor power management is performed in stages or phases. Power-performance management algorithms grouped into separate phases may be performed sequentially (phase-by-phase) to arrive at one or more final control parameters. Ordering the algorithms according to phases allows for potentially numerous management algorithms while maintaining algorithm independence so that each may be separately optimized. With the framework described in accordance with some embodiments herein, an algorithm hierarchy is established through a temporal sequencing of the management algorithm processing. In some embodiments, each phase is associated with one or more specific power management algorithms. In some embodiments, subsequent power-performance management phases may override control parameters values applied by an earlier phase. In other words, control parameter values determined by any algorithms executed first in time as part of a precedent phase are candidates for being modified by any algorithms executed second in time as part of a subsequent phase. Algorithms that may generate conflicting control parameter values are therefore to be separated into different phases, with any in the later stage having priority. This hierarchical management structure is one of the driving factors for the exemplary sequential ordering of algorithms described for one or more embodiment herein. Another driving factor is dependency of one management algorithm on the control made during the previous phase. Hence, sequential management algorithm ordering should reflect both algorithm dependency and a hierarchical management structure.

Once all phase are completed and all potential control parameter modifications made, a finalized set of control parameter values (requests) may be output to configure hardware associated with one or more graphics processor resource. The graphics processor power management phases may then be repeated to arrive at another set of control parameter values based on more recent graphics processor performance data.

Figure 16:
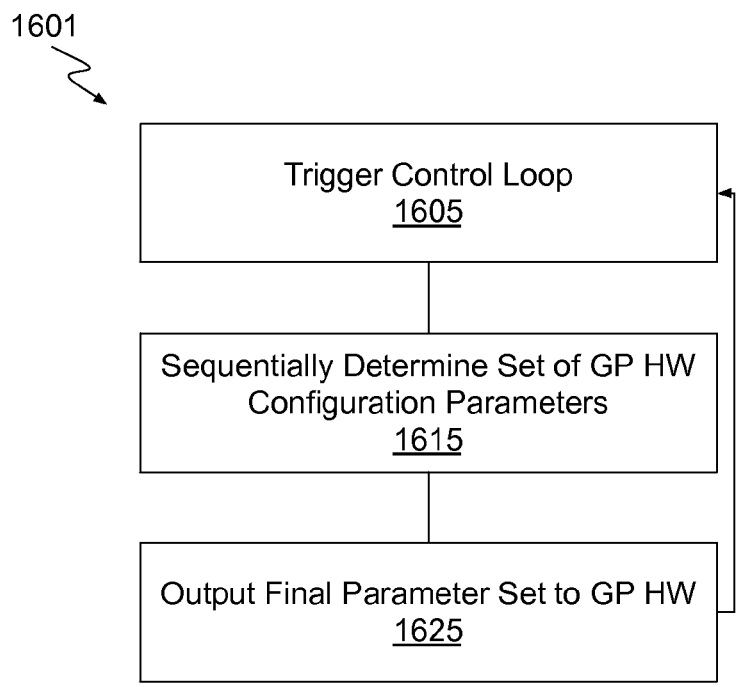
FIG. 16 is a flow diagram illustrating a phased graphics processor power management method employing a sequential control loop, in accordance with some embodiments.

FIG. 16 is a flow diagram illustrating a phased graphics processor power management method 1601 employing a sequential control loop, in accordance with some embodiments, in accordance with some embodiments. Method 1601 begins at operation 1605 where a trigger initiates the control loop. In some embodiments, the control loop is initiated based on a passage of a predetermined time (e.g., loop is executed with a fixed period). The predetermined time for example may be based on a specific evaluation interval over which performance data is to be collected. In some embodiments, method 1601 is initiated at a fixed period of 100 milliseconds, or more. Relative to the rate at which workloads are processed (and contexts may be switched), method 1601 may then be considered a slow loop. Depending on the resources allocated to executing method 1601, the loop may be initiated more frequently (e.g., every 10 ms, or less). In some other embodiments, method 1601 is initiated based on one or more trigger events. Once initiated, method 1601 proceeds to operation 1615 where a set of graphics processor hardware configuration parameters is sequentially determined following a predetermined order. At operation 1625 the set of parameters are assembled into an output signal (e.g., a control parameter vector) communicated as requests to the graphics processor resources.

Figure 17:
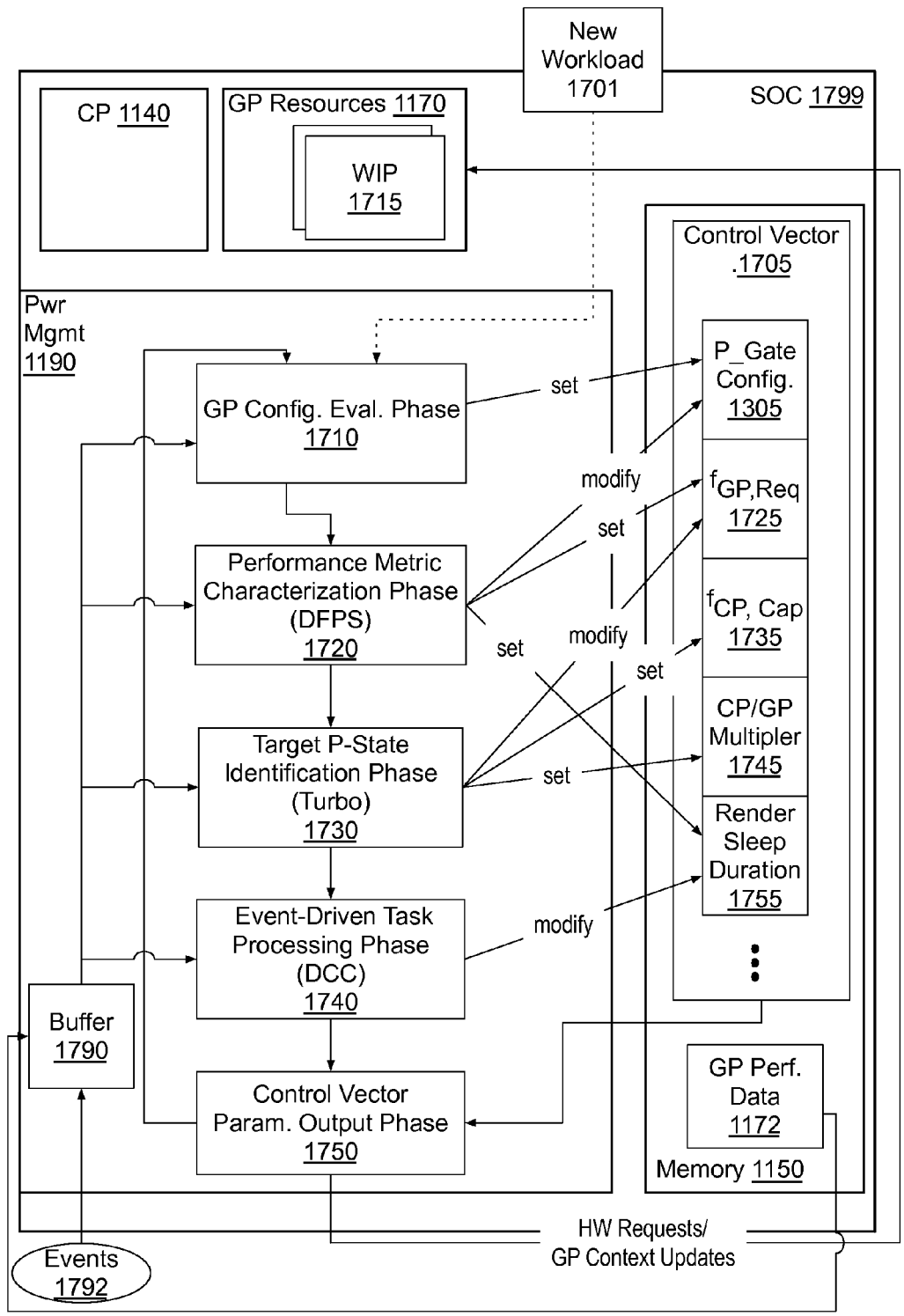
FIG. 17 is a block diagram further illustrating a phased graphics processor power management architecture employing a sequential control loop, in accordance with some embodiments.

FIG. 17 is a block diagram further illustrating a phased graphics processor power management architecture employing a sequential control loop, in accordance with some embodiments.). In some exemplary embodiments, central processor 1140, memory 1150, and graphics processor resources 1170 are all components on a single chip (SoC 1799). The management structure illustrated in FIG. 17 may be practiced independent of contextual power-performance control of graphics processor resources, or it may be utilized to in conjunction with contextual power-performance control. In one embodiment, a sequential power management control loop is implemented in conjunction with context-specific control parameters to generate control parameter value updates to the graphics processor context information. In another embodiment, a sequential power management control loop generates a set of control parameters output as a global control effort in the absence of any context-specific control. In some embodiments, a sequential power management control loop generates a set of control parameters that includes both global control parameters and context-specific control parameters. Hence, some global control parameters (e.g., DCC) may be generated even if context-specific control parameters (e.g., defining the number of powered slices and/or EUs, and there associated operating frequency) are also generated. In still other embodiments, a sequential power management control loop generates a set of control parameters that includes one or more control parameter that may be either context-specific, or global (e.g., where management algorithms are switchable between global or context level performance targets.)

Power management logic 1190 is configured to sequentially perform various control phases, each of which is associated with one or more graphics processor power-performance management algorithm and generates one or more control parameter value. In some embodiments, power management logic 1190 is to perform each phase, one after the other, during a control loop iteration executed once for each performance evaluation interval. Graphics processor performance data 1172 collected during a given evaluation interval is queued in a FIFO buffer 1790 for input into algorithms in one or more of the management phases. All data in the buffer may be processed together during a single pass through a power management phase to generate one or more parameters values of a control vector 1705 to be output at operation 1750.

In some embodiments where graphics processor contexts are switching with workload, the management phases illustrated in FIG. 17 may be further partitioned between contexts, such that control vector 1705 is a context-specific control vector generated for each context evaluated during one particular power management evaluation interval. For such embodiments, control vector 1705 contains information for updating the associated graphics processor context data stored in memory. For example, where three contexts have switched in and out during an evaluation interval, each management phase illustrated in FIG. 17 may generate three independent control parameter sets, output as three control vectors 1705 written out to update three different graphics processor contexts. Furthermore, where a context has switched in and out N times over an evaluation interval, FIFO buffer 1790 may queue performance data 1172 generated during each of N runs associated with graphics processor time slices for the relevant context. All the context-specific data collected over the evaluation interval may then be processed in the current management loop iteration to arrive at control parameter values.

In some embodiments, subsequent power-performance management phases may override control parameters values applied by an earlier phase. This hierarchical management structure is one of the driving factors for the exemplary sequential ordering of algorithms described for one or more embodiment herein. Another driving factor is dependency of one management algorithm on the control made during the previous phase. Hence, sequential management algorithm ordering should reflect both a hierarchical algorithm dependency and a hierarchical management structure.

In some embodiments, during a first phase power management logic 1190 is to evaluate the graphics processor configuration needed to process one or more new workloads at operation 1710. In some embodiments, the minimum graphics processor resources needed to process a new workload 1701 is determined. By minimizing the active components during this first phase, a greater energy budget may be liberated to run the minimum resource set faster (e.g., at a high operating frequency). The algorithms processed during operation 1710 output an initial power gate configuration 1305 for at least the graphics processor resources 1170. The configuration settings are stored to memory 1150, for example, as one or more control parameter values in control vector 1705. The configuration settings may also be provided as an input to subsequent power management control phases.

In some embodiments, during a subsequent second phase, power management logic 1190 is to execute one or more power-performance algorithm to characterize performance metrics for one or more workloads in process (WIP) 1715, and determine performance targets at operation 1720. Exemplary performance metrics include any of those introduced above (e.g., workload flip-rate, display refresh-rate, and resource idleness). Targets, such as a maximum workload frame-rate that can be achieved in the current platform environment (battery life, chip temperature, OS power-plan setting, etc.) are determined for the chosen performance metrics. The performance targets are output to populate additional fields of control vector 1705, and/or modify one or more power gating configuration values set during the first phase. Power gating configuration values may be modified for example when the performance characterization indicates the power gating configuration values set during the first phase are too aggressive for the operating environment. The performance targets may be further provided as an input to subsequent power management control phases, along with associated configuration settings.

In some embodiments, during the second phase power management logic 1190 is execute one or more power-performance algorithm to detect significant changes in the workloads processed (e.g., associated with a display transition between partial and full screen rendering). In response to detecting such a change, power management logic 1190 is to re-evaluate the performance characteristics and targets selected during the second phase. Hence, in the phased architecture all workload analysis algorithms may be implemented together during the second phase, for example with a dynamic frequency and power scaling (DFPS) unit.

In some embodiments, during a subsequent third phase, power management logic 1190 is to execute one or more power-performance algorithm to attain the performance targets determined in the second stage with the configuration defined in the first and second stages. At operation 1730, power state hardware controls, such as operating frequency targets (e.g. $f_{GP,\ Req}$) 1725, frequency thresholds (e.g., $f_{CP,Cap}$) 1735, and/or multipliers (e.g., $f_{CP}/f_{GP}$) 1745 are to be set. During this third phase, power management logic 1190 may set the power state hardware controls based on relevant power, current, and/or thermal limits. In some SoC embodiments, these limits are chip-level thermal and/or power constraints. Constraint information processed in the third phase may be received, for example, from a power controller block responsible for chip management. Hence, the power-performance management algorithms included in the third phase may modify operating frequency targets (e.g., $f_{GP,\ Req}$) 1725 and thresholds 1735 in an effort to balance the energy budget across various SoC resources (e.g., CP and GP) to best maintain the performance targets. In some embodiments, a phase three algorithm implemented at operation 1730 overclocks one or more graphics resources (e.g., with IA turbo boost technology) as needed to achieve a performance target, and as limited by processor power, current, and/or thermal limits of the SoC.

In some embodiments, during a subsequent fourth phase, power management logic 1190 is to execute one or more power-performance algorithm at operation 1740 to process one or more event driven tasks. Events processed at operation 1740 may be non-workload specific conditions, such as a high temperature condition or other stress indication event. Such events, may for example, be received from an SoC power block. In the exemplary embodiment, sleep states of one or more graphics resources (e.g., rC6 duration 1755) are set by one or more algorithms during the fourth phase. Duty cycle control implemented during the fourth phase may modify controls set by the earlier phases, overriding them in recognition of a received event, such as a display flip interrupt or SOC interrupt. Hence, phase four includes a last set of power management algorithms in the exemplary power management control loop depicted in FIG. 17. In some embodiments, event processing at phase four is interrupt-based, while the preceding phases are timer-based. As received events 1792 enter buffer 1790, a decision is made whether the event is critical requiring the management loop to process the event immediately, or if it can stored until next time event. With each iteration of the power management control loop, phase-four algorithms executed at operation 1740 may process one or more events stored in buffer 1790. A priority event may be handled, or simply a next non-critical event may be popped off buffer 1790.

At operation 1750 power management logic 1190 is to output a control signal indicative of the set of power management control parameter values assembled into control vector 1705 during the current management loop iteration. With all power management control parameter values set through sequential execution all power-performance management algorithms, the control vector 1705 may be converted to one compatible set of requests. The requests may be output directly to graphics and central processor hardware, or output as an update to one or more graphics processor contexts stored in memory. The compatible set of requests are then implemented by the hardware for the duration of a subsequent power management evaluation interval, or each time the corresponding graphics processor context is switched in during the subsequent power management evaluation interval. Upon outputting the control requests at operation 1750, power management logic 1190 is to begin a subsequent power management control loop iteration with the first phase algorithms, and repeat the subsequent phases substantially as described above to arrive at a subsequent control vector for output.

In some embodiments, iteration of operations 1710-1750 is performed on a slow loop, for example generating a set of control parameter request values every 50-150 milliseconds. This slow management loop may be integrated with graphics processor contexts that enable fast workload-specific switching of at least some control parameter values. Slow-loop processing may be utilized to determine global performance targets on the slow management loop time scale, and to update context-specific parameters that may be switched-in and out many times during one iteration of the power-performance management loop.

Phased Graphics Processor Management with GP Contexts

Figure 18:
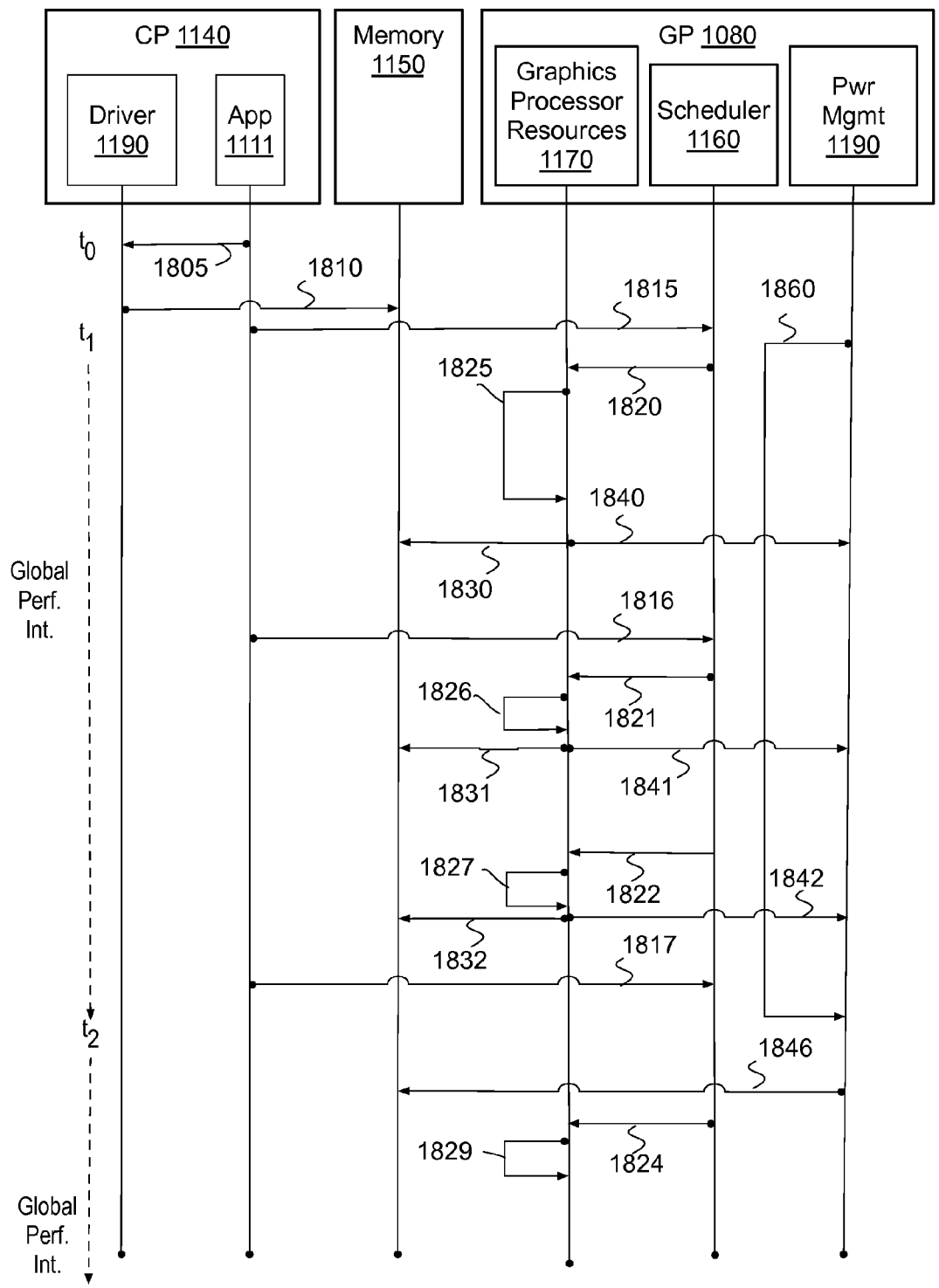
FIG. 18 is a parallel flow chart depicting interactions of components in a system managing power-performance of graphics workload processing associated with multiple applications, in accordance with some embodiments.

FIG. 18 is a parallel flow chart depicting interactions of components in a system managing power-performance of graphics workload processing associated with multiple applications, in accordance with some embodiments. At time to, an application 1111, executing in a user space of an OS instantiated by central processor 1140, interfaces with a (kernel mode) graphics processor driver 1109 to open one or more graphics processor connections at operation 1805. In an embodiment, for example where application 1111 is a 3D game, at least a render context and a compute context is requested at operation 1805. In response, driver 1109 allocates memory 1150 for at least two new graphics processor contexts at operation 1810. In one exemplary embodiment, both a render context and a compute context are created at operation 1810.

At operation 1815, application 1111 sends a compute workload to graphics processor 1080 (e.g., via graphics processor driver 1109). At operation 1820, scheduler logic 1160 sends the compute workload for a time slice on graphics processor resources 1170 along with a command string switching-in a compute resource configuration (e.g., at least an operating frequency and power-gating configuration) as defined in the compute context information stored in memory 1150. At operation 1825, graphics processor resources 1170 process the compute workload while in the compute context configuration. Independently, power management logic 1190 begins a next power management process 1860 at evaluation start time $t_1$. In some embodiments, the power management process 1860 comprises a plurality of ordered phases of algorithms processing performance data previously generated by and/or collected for graphics processor resources 1170.

At operation 1830, graphics processor resources 1170 output compute workload results to memory 1150. At operation 1840, graphics processor resources 1170 further output performance data associated with running the compute context workload. The performance data is output for analysis by power management logic 1190 during a subsequent evaluation interval. At operation 1816, application 1111 sends a plurality of render workloads to graphics processor 1080 (e.g., via graphics processor driver 1109). At operation 1821, scheduler logic 1160 sends a first render workload for a time slice on graphics processor resources 1170 along with a command string switching-in a resource defined the render context information stored in memory 1150. At operation 1826, graphics processor resources 1170 process the first render workload while in the render context. At operation 1831, graphics processor resources 1170 output render workload results to memory 1150. At operation 1841, graphics processor resources 1170 further output performance data associated with running the render context workload for subsequent analysis.

At operation 1822, scheduler logic 1160 sends a second render workload for a time slice on graphics processor resources 1170 along with a command string maintaining the render resource configuration. At operation 1827, graphics processor resources 1170 process the second render workload while in the render context. At operation 1832, graphics processor resources 1170 output render workload results to memory 1150. At operation 1842, graphics processor resources 1170 further output performance data associated with running the second render context for subsequent analysis.

At operation 1817, application 1111 sends a compute workload to graphics processor 1080. At time t2, the DFPS performance evaluation interval ends, and the performance data collected at operations 1840, 1841, and 1842 is now ready for evaluation during a subsequent evaluation interval (not depicted). Power management process 1860 ends, for example after sequentially executing all phases of a power management loop once. In some embodiments, the power management process averages all stored performance data to determine one or more control parameter. In other embodiments performance data associated with a first graphics processor context is evaluated independently from data associated with a second context to determine one or more control parameter updates for the contexts. In some embodiments, a control vector assembled during power management process 1860 is output at operation 1846 as control parameter values written out to memory 1150. The control parameter values output at operation 1846, for example, update both the render and compute contexts stored in memory 1150. At operation 1824, a compute workload is scheduled for processing by graphics processor resources 1170. The workload is processed at operation 1829 using parameters defined in the compute context updated at operation 1846. Power management process 1860 continues to adjust control parameters to maintain performance targets while in the runtime phase (e.g., until a new application begins rendering, or a full-screen transition occurs, etc.).

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to be physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Besides what is described herein, various modifications can be made to the disclosed embodiments and implementations of the invention without departing from their scope. Therefore, the illustrations and examples herein should be construed in an illustrative, and not a restrictive sense. The scope of the disclosure should be measured solely by reference to the claims that follow.

The following paragraphs briefly describe some exemplary embodiments:

In one or more first embodiments, a system comprises a central processor (CP), a graphics processor (GP) communicatively coupled to the CP and including one or more GP resource, and an electronic memory communicatively coupled to at least the GP and to store a first graphics processor (GP) context specifying a first hardware configuration of the one or more GP resources, and a second GP context specifying a second hardware configuration of the one or more GP resources. The one or more GP resources are to be configured in a first hardware configuration based on the first GP context in response to the GP receiving a first workload, and are to process the first workload while in the first hardware configuration. The one or more GP resources are to be reconfigured based on the second GP context in response to receiving a second workload, and to process the second workload with the one or more GP resources in the second hardware configuration.]

In furtherance of the first embodiments, the memory is to store the first GP context in association with a first application executable on the CP, and store the second GP context in association with a second application executable on the CP. The GP is to configure the one or more GP resources based on the first GP context in response to receiving the first workload from the first application, and configure the one or more GP resources based on the second GP context in response to receiving the second workload from the second application.

In furtherance of the first embodiments, the first and second GP contexts each specify at least a power-gating configuration or an operating frequency of the one or more GP resources.

In furtherance of the first embodiments, the system further comprises workload scheduling logic to schedule a switching of the one or more GP resources between the first and second hardware configurations in coordination with the first and second workload processing.

In furtherance of the first embodiments, the system further comprises power management logic to perform an evaluation of one or more GP power management algorithms associated with a first GP power management evaluation time interval during which at least the first workload and second workload are processed, and update at least one of the first GP context or second GP context, or reconfigure the one or more GP resource, based on the evaluation.

In furtherance of the embodiment immediately above, the power management logic is to determine a dominant GP context associated with the greatest portion of the first GP power management evaluation time interval, employ in the one or more GP power management algorithms, a performance target associated with the dominant GP context in response to the dominant GP context occupying a threshold portion of the first evaluation time interval, and employ in the one or more GP power management algorithms, a performance target associated with an averaging over the evaluation time interval in response to the dominant GP context failing to occupy the threshold portion of the first evaluation time interval.

In furtherance of the first embodiments above, the power management logic is to enable or disable GP context control of the one or more GP resources over a second GP power management evaluation time interval in response to a number of contexts processed within the first evaluation time interval exceeding a predetermined threshold.

In furtherance of the first embodiments above, the power management logic is to sequentially execute a GP power management control loop once in each GP power management evaluation time interval, the loop comprising an identification of the one or more GP resources that may be power-gated without impacting performance of workload processing, a determination of one or more performance targets associated with workload processing, an identification of one or more target power states that achieve the one or more performance targets, and an output of one or more hardware configuration parameter request indicative of the GP resource power-gating, performance targets, or target power states.

In furtherance of the first embodiments, the CP, GP and memory are components of a system-on-chip (SoC), and the GP includes a microcontroller with logic circuitry to schedule the first and second workloads on the one or more GP resources, perform an evaluation of one or more GP power management algorithms associated with a first GP power management evaluation time interval during which at least the first workload and second workload are processed, and update at least one of the first GP context or second GP context, or reconfigure the one or more GP resource, based on the evaluation.

In one or more second embodiments, a computer-readable media, includes instructions stored thereon, which when executed by a processing system, cause the system to perform a method, comprising storing a first graphics processor (GP) context in association with a first application executing on a computer system, the first GP context specifying a first hardware configuration of one or more GP resources of the system, storing a second GP context in association with a second application executing on the system, the second GP context specifying second hardware configuration of the one or more GP resource, controlling the one or more GP resources into a first hardware configuration based on the first GP context in response to receiving a first workload associated with the first application, processing the first workload with the GP resources in the first hardware configuration, reconfiguring the one or more GP resources into a second hardware configuration based on the second GP context in response to receiving a second workload associated with the second application, and processing the second workload with the one or more GP resources in the second hardware configuration.

In furtherance of the second embodiments above, the processing of the first workload is during a first time slice, the processing of the second workload is during a second time slice, and the method further comprises performing an evaluation of one or more GP power management algorithms associated with a first GP power management evaluation time interval that includes at least both the first and second time slices, and updating at least one of the first GP context or second GP context, or reconfiguring the one or more GP resource, based on the evaluation.

In furtherance of the second embodiments above, the media further comprises instructions to cause the processing system to further perform the method comprising determining a dominant GP context associated with the greatest portion of the first GP power management evaluation time interval, employing, in the one or more GP power management algorithms, a performance target associated with the dominant GP context in response to the dominant GP context occupying a threshold portion of the first evaluation time interval, and employing, in the one or more GP power management algorithms, a performance target associated with an averaging over the evaluation time interval in response to the dominant GP context failing to occupy the threshold portion of the first evaluation time interval.

In furtherance of the second embodiments above, the media further comprises instructions to cause the processing system to further perform the method comprising enabling or disabling GP context control of the one or more GP resources over a second GP power management evaluation time interval in response to a number of contexts processed within the first evaluation time interval exceeding a predetermined threshold.

In furtherance of the second embodiment immediately above, the one or more GP resources are reconfigured once, based on the GP power management algorithm evaluation, for the duration of a second GP power management evaluation time interval in response to disabling GP context control.

In one or more third embodiments, a system, comprises a central processor (CP), and a graphics processor (GP) communicatively coupled to the CP and including one or more GP resource, wherein the CP or GP includes logic to sequentially determine a set of graphics processor (GP) hardware configuration parameter requests based on different management algorithms, and output the set of configuration parameter requests to one or more graphics processor (GP) resources.

In furtherance of the third embodiments above, to sequentially determine the configuration parameter set, the GP is to determine one or more first parameter values indicative of one or more GP resources not contributing to performance of a workload that may be powered down, determine one or more second parameter values indicative of one or more performance targets associated with processing the workload with the one or more GP resources that are not to be powered-down, and identify one or more third parameter values indicative of target power states for the one or more GP resources powered-up needed to achieve the one or more performance targets.

In furtherance of the third embodiment immediately above, wherein to sequentially determine the configuration parameter set, the GP is further to process one or more non-workload-specific event-driven tasks, and modify at least one of the parameter values previously determined for the parameter set based on the event-driven task processing.

In furtherance of the third embodiments, one sequential determination of a configuration parameter set is determined for each GP power management interval, and each sequential determination of a configuration parameter set is triggered periodically, or in response to an event.

In one or more fourth embodiments, a computer-readable media includes instructions stored thereon, which when executed by a processing system, cause the system to perform a method, comprising sequentially determining a set of graphics processor (GP) hardware configuration parameter requests, and outputting the set of configuration parameter requests to one or more graphics processor (GP) resources.

In furtherance of the fourth embodiments, sequentially determining the configuration parameter set further comprises determining one or more parameter values indicative one or more GP resources not contributing to performance of a workload that may be powered down, determining one or more parameter values indicative of one or more performance targets associated with processing the workload with the one or more GP resources powered-up, and identifying one or more parameter values indicative of target power states for the one or more GP resources powered-up needed to achieve the one or more performance targets.

In furtherance of the fourth embodiments, the media further comprises instructions, which when executed by the processing system, further cause the system to perform the method further comprising processing one or more non-workload-specific event-driven tasks, and modifying at least one of the parameter values previously determined for the parameter set based on the event-driven task processing.

In furtherance of the fourth embodiments, determining the one or more parameter values indicative of the base level configuration, the one or more performance targets, or the target power states, further comprises storing, in association with a first GP context, GP performance data generated when first workloads are processed with the one or more GP resource configured based on the first GP context, storing, in association with a second GP context, GP performance data generated when second workloads are processed with the one or more GP resource configured based on the second GP context, and averaging the stored GP performance data between the first and second GP contexts, or processing GP performance data associated with the first GP context independently from GP performance data associated with the second GP context. Outputting the configuration parameter set to one or more graphics processor (GP) resources further comprises outputting to the one or more GP hardware resource global configuration parameter requests determined based on the averaged GP performance data, or updating the first and second GP contexts with GP context-specific parameter values determined based on the independently processed GP performance data.

In one or more fifth embodiment, a computer-implemented method comprises storing a first graphics processor (GP) context in association with a first application executing on a computer system, the first GP context specifying a first hardware configuration of one or more GP resources of the system, storing a second GP context in association with a second application executing on the system, the second GP context specifying second hardware configuration of the one or more GP resource, configuring the one or more GP resources based on the first GP context in response to receiving a first workload associated with the first application, processing the first workload with the GP resources in the first hardware configuration, reconfiguring the one or more GP resources based on the second GP context in response to receiving a second workload associated with the second application, and processing the second workload with the one or more GP resources in the second hardware configuration.

In furtherance of the fifth embodiments, the first and second GP contexts each specify at least a power-gating configuration or an operating frequency of the one or more GP resources.

In furtherance of the fifth embodiment immediately above, the first and second GP contexts each specify both the power-gating configuration and operating frequency of the one or more GP resources, and further specify a maximum operating frequency of one or more central processor (CP) resources executing the first or second application, or an operating frequency multiplier associated with the one or more CP resources and the one or more GP resources.

In furtherance of the fifth embodiments, the processing of the first workload is during a first time slice. The processing of the second workload is during a second time slice. The method further comprises performing an evaluation of one or more GP power management algorithms associated with a first GP power management evaluation time interval that includes at least both the first and second time slices, and updating at least one of the first GP context or second GP context, or reconfiguring the one or more GP resource, based on the evaluation.

In furtherance of the fifth embodiment immediately above, the method further comprises determining a dominant GP context associated with the greatest portion of the first GP power management evaluation time interval, employing, in the one or more GP power management algorithms, a performance target associated with the dominant GP context in response to the dominant GP context occupying a threshold portion of the first evaluation time interval, and employing, in the one or more GP power management algorithms, a performance target associated with an averaging over the evaluation time interval in response to the dominant GP context failing to occupy the threshold portion of the first evaluation time interval.

In furtherance of the fifth embodiment above, further comprises determining a dominant GP context associated with the greatest portion of the first GP power management evaluation time interval, and enabling or disabling GP context control of the one or more GP resources over a second GP power management evaluation time interval based on the portion of the first evaluation time interval occupied by the dominant GP context.

In furtherance of the fifth embodiment immediately above, the one or more GP resources are reconfigured for each workload processed during the second GP power management evaluation time interval based on the associated GP contexts in response to the dominant GP context occupying a threshold portion of the first evaluation time interval, or the one or more GP resources are reconfigured once, based on the GP power management algorithm evaluation, for the duration of a second GP power management evaluation time interval in response to disabling GP context control in response to the dominant GP context failing to occupy the threshold portion of the first evaluation time interval.

In furtherance of the fifth embodiment above, the processing of the first workload is during a first GP context evaluation interval associated with the first GP context, and the method further comprises controlling the one or more GP resources during the first GP context evaluation interval with a power management algorithm that maximizes performance of the one or more GP resources, updating the first GP context with one or more performance targets determined during the first evaluation interval as state information associated with the first context, and reconfiguring the one or more GP resource based on the updated first GP context in response to receiving another workload associated with the first application.

In furtherance of the fifth embodiment above, the method further comprises sequentially executing a GP power management control loop once in each GP power management evaluation time interval, the loop comprising identifying any of the one or more GP resources that may be powered-down without impacting performance of workload processing, determining one or more performance targets associated with workload processing, identifying one or more target power states to achieve the one or more performance targets, and outputting one or more hardware configuration parameter indicative of GP resources to be power-gated, one or more performance targets, or target power states.

In furtherance of the fifth embodiment immediately above, wherein the identifying any of the one or more GP resources that may be powered-down further comprises evaluating the one or more GP resources in the first hardware configuration and identifying at least one of a media block, codec, or execution unit not contributing to the processing of the first workload, determining the one or more performance targets further comprises determining a maximum frame/second (fps) associated with processing the first workload, identifying the one or more target power states further comprises modifying the operating frequency of one or more execution units based on the one or more performance targets, and outputting the one or more hardware configuration parameter further comprises updating the stored first GP context with one or more GP configuration parameters indicative of powering down the at least one media block, codec, or execution unit, the maximum fps, and the operating frequency of the one or more execution units.

In one or more sixth embodiment, computer-implemented power management control method comprises sequentially determining a set of graphics processor (GP) hardware configuration parameters, and outputting the configuration parameter set to one or more graphics processor (GP) resources. Sequentially determining the configuration parameter set further comprises determining one or more parameter values indicative of a base level configuration of GP resources needed by a workload, the base level indicative of one or more GP resources not contributing to performance of a workload that may be powered down, determining one or more parameter values indicative of one or more performance targets associated with processing the workload with the one or more GP resources powered-up in the base level configuration, and identifying one or more parameter values indicative of target power states for the one or more GP resources powered-up in the base level configuration needed to achieve the one or more performance targets.

In furtherance of the sixth embodiment immediately above, sequentially determining the parameter set further comprises processing one or more non-workload-specific event-driven tasks, and modifying at least one of the parameter values previously determined for the parameter set based on the event-driven task processing.

In furtherance of the sixth embodiment, one sequential determination of a configuration parameter set is determined for each GP power management interval, and each sequential determination of a configuration parameter set is triggered periodically, or in response to an event.

In furtherance of the sixth embodiment, processing the one or more non-workload-specific event-driven task further comprises popping one or more event from a FIFO event buffer with each sequential determination of one configuration parameter set.

In furtherance of the sixth embodiment, determining the one or more parameter values indicative of the base level configuration, the one or more performance targets, or the target power states, further comprises storing, in association with a first GP context, GP performance data generated when first workloads are processed with the one or more GP resource configured based on the first GP context, storing, in association with a second GP context, GP performance data generated when second workloads are processed with the one or more GP resource configured based on the second GP context, and averaging the stored GP performance data between the first and second GP contexts, or processing GP performance data associated with the first GP context independently from GP performance data associated with the second GP context. Outputting the configuration parameter set to one or more graphics processor (GP) resources further comprises outputting to the one or more GP hardware resource global configuration parameter values determined based on the averaged GP performance data, or updating the first and second GP contexts with GP context-specific parameter values determined based on the independently processed GP performance data.

In one or more seventh embodiment, a computer-readable media includes instructions stored thereon, which when executed by a processing system, cause the system to perform any one of the fifth embodiments.

In one or more eighth embodiment, a system comprises a computerized means to perform any one of the fifth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A system, comprising:
    a central processor (CP) to execute a first application and a second application;
    a graphics processor (GP) communicatively coupled to the CP and including one or more GP resources, the GP to receive from the CP a first workload originated by the first application and a second workload originated by the second application;
    an electronic memory communicatively coupled to at least the GP, and to store a first application-specific graphics processor (GP) context in association with the first application, the first GP context specifying a first hardware configuration of the GP resources, and to store a second application-specific GP context in association with the second application, the second GP context specifying a second hardware configuration of the GP resources; and
    wherein the GP includes a microcontroller to:
        determine the first hardware configuration of the GP resources from the first GP context stored in the memory in response to the origin of the first workload being the first application;
        configure the GP resources into the first hardware configuration, as specified by the first GP context;
        schedule processing of the first workload on the GP resources in the first hardware configuration;
        determine the second hardware configuration of the GP resources from the second GP context stored in the memory in response to the origin of the second workload being the second application;
        reconfigure the GP resources into the second hardware configuration, as specified by the second GP context;
        schedule processing of the second workload on the GP resources in the second hardware configuration;
        perform an evaluation of one or more GP power management algorithms over a first GP power management evaluation time interval during which at least the first workload and second workload are processed; and
        update a performance target defined in at least one of the first GP context or second GP context based on the evaluation, wherein the performance target is to be targeted by a power management algorithm executed when the GP resources are subsequently in the first or second hardware configuration, respectively.

2. The system of claim 1, wherein the first and second GP contexts each specify at least a power-gating configuration or an operating frequency of the one or more GP resources.

3. The system of claim 1, wherein the microcontroller further comprises workload scheduling logic to schedule a switching of the one or more GP resources between the first and second hardware configurations in coordination with the first and second workload processing.

4. The system of claim 1, wherein the microcontroller is to:
    determine a dominant GP context that specifies the hardware configuration of the GP resources for a largest cumulative time within the first GP power management evaluation time interval;
    employ, in the one or more GP power management algorithms, a performance target associated with the dominant GP context in response to the dominant GP context occupying a threshold portion of the first evaluation time interval; and
    employ, in the one or more GP power management algorithms, a performance target associated with an averaging over the evaluation time interval in response to the dominant GP context failing to occupy the threshold portion of the first evaluation time interval.

5. The system of claim 1, wherein the power management logic is to enable or disable GP context control of the one or more GP resources over a second GP power management evaluation time interval in response to a number of contexts processed within the first evaluation time interval exceeding a predetermined threshold.

6. The system of claim 1, wherein the power management logic is to:
    sequentially execute a GP power management control loop once in each GP power management evaluation time interval, the loop comprising:
        an identification of the one or more GP resources that may be power-gated without impacting performance of workload processing;
        a determination of one or more performance targets associated with workload processing;
        an identification of one or more target power states that achieve the one or more performance targets; and
        an output of one or more hardware configuration parameter requests indicative of the GP resource power-gating, performance targets, or target power states.

7. The system of claim 1, wherein:
    the CP, GP and memory are components of a system-on-chip (SoC).

8. A non-transitory computer-readable media, including instructions stored thereon, which when executed by a processing system, cause the system to perform a method, comprising:
    executing a first application and a second application;
    storing a first application-specific graphics processor (GP) context in association with the first application, the first GP context specifying a first hardware configuration of one or more GP resources of the system;
    storing a second application-specific GP context in association with the second application, the second GP context specifying a second hardware configuration of the one or more GP resource;
    determining the first hardware configuration of the GP resources from the first GP context stored in memory in response to the origin of the first workload being the first application;
    configuring the GP resources into the first hardware configuration, as specified by the first GP context;
    processing the first workload with the GP resources in the first hardware configuration;

determining the second hardware configuration of the GP resources from the second GP context stored in memory in response to the origin of the second workload being the second application;
reconfiguring the GP resources into the second hardware configuration, as specified by the second GP context;
processing the second workload with the one or more GP resources in the second hardware configuration;
performing an evaluation of one or more GP power management algorithms over a first GP power management evaluation time interval during which at least the first workload and second workload are processed; and
updating a performance target defined in at least one of the first GP context or second GP context based on the evaluation, wherein the performance target is to be targeted by a power management algorithm executed when the GP resources are subsequently in the first or second hardware configuration, respectively.

9. The media of claim 8, further comprising instructions to cause the processing system to further perform the method comprising:
determining a dominant GP context that specifies the hardware configuration of the GP resources for a largest cumulative time within of the first GP power management evaluation time interval;
employing, in the one or more GP power management algorithms, a performance target associated with the dominant GP context in response to the dominant GP context occupying a threshold portion of the first evaluation time interval; and
employing, in the one or more GP power management algorithms, a performance target associated with an averaging over the evaluation time interval in response to the dominant GP context failing to occupy the threshold portion of the first evaluation time interval.

10. The media of claim 8, further comprising instructions to cause the processing system to further perform the method comprising enabling or disabling GP context control of the one or more GP resources over a second GP power management evaluation time interval in response to a number of contexts processed within the first evaluation time interval exceeding a predetermined threshold.

11. The media of claim 10, wherein the one or more GP resources are reconfigured once, based on the GP power management algorithm evaluation, for the duration of a second GP power management evaluation time interval in response to disabling GP context control.

* * * * *